US009122933B2

(12) United States Patent
Palan

(10) Patent No.: US 9,122,933 B2
(45) Date of Patent: Sep. 1, 2015

(54) AFTER MARKET DRIVING ASSISTANCE SYSTEM

(71) Applicant: Mighty Carma, Inc., Santa Clara, CA (US)

(72) Inventor: Saurabh Palan, Santa Clara, CA (US)

(73) Assignee: Mighty Carma, Inc., Santa Clara, CA (US)

( * ) Notice: Subject to any disclaimer, the term of this patent is extended or adjusted under 35 U.S.C. 154(b) by 346 days.

(21) Appl. No.: 13/802,388

(22) Filed: Mar. 13, 2013

(65) Prior Publication Data

US 2014/0266655 A1      Sep. 18, 2014

(51) Int. Cl.
| | | |
|---|---|---|
| *B60Q 1/00* | (2006.01) | |
| *G06K 9/00* | (2006.01) | |
| *G08G 1/052* | (2006.01) | |
| *G08G 1/0962* | (2006.01) | |
| *G08G 1/0967* | (2006.01) | |
| *G08G 1/16* | (2006.01) | |

(52) U.S. Cl.
CPC ............ *G06K 9/00805* (2013.01); *G08G 1/052* (2013.01); *G08G 1/09626* (2013.01); *G08G 1/096716* (2013.01); *G08G 1/096775* (2013.01); *G08G 1/166* (2013.01); *G08G 1/167* (2013.01)

(58) Field of Classification Search
CPC .................................................. G06K 9/00805
USPC ......... 340/287, 435, 436, 576, 901, 903, 905, 340/907, 932, 933, 937; 701/1, 23, 36, 41, 701/49, 116, 301
See application file for complete search history.

(56) References Cited

U.S. PATENT DOCUMENTS

| | | | | |
|---|---|---|---|---|
| 5,504,679 | A   * | 4/1996 | Wada et al. ...................... 701/41 |
| 7,755,510 | B2 * | 7/2010 | Bilimoria et al. ............. 340/932 |
| 7,798,659 | B2 * | 9/2010 | Englander ...................... 359/871 |
| 8,098,170 | B1 * | 1/2012 | Szczerba et al. .............. 340/905 |
| 8,108,083 | B2 * | 1/2012 | Kameyama ...................... 701/1 |
| 8,144,033 | B2 * | 3/2012 | Chinomi et al. .............. 340/937 |
| 8,503,972 | B2 * | 8/2013 | Haler et al. ................ 455/404.1 |
| 8,526,681 | B2 * | 9/2013 | Akutsu ......................... 382/107 |

(Continued)

OTHER PUBLICATIONS

Co-Pending U.S. Appl. No. 13/802,455, by Palan et al., filed Mar. 13, 2013.

(Continued)

*Primary Examiner* — Paul Obiniyi
(74) *Attorney, Agent, or Firm* — Perkins Coie LLP

(57) ABSTRACT

The system comprises a sensing system and a speed detection system to monitor and gather information associated with a driver, a vehicle being operated by the driver, a monitored area proximate to the vehicle. The system further comprises a display module located within the interior of the vehicle and a controller in communication with the speed detection system, the sensing system and the display module. Upon receiving the gathered information from the sensing system, the controller utilizes the gathered information to detect the presence and the proximity of an object in the monitored zone of the vehicle and the speed of the vehicle. Upon detecting said object in the monitored zone of the vehicle, the controller determines the appropriateness of providing a warning to a driver of the vehicle regarding said object. The appropriateness of providing the warning is determined as a function of the proximity of said object to the vehicle and a speed of the vehicle. Upon determining that the warning is appropriate, the controller displays the warning to the driver through the display module.

19 Claims, 14 Drawing Sheets

(56) References Cited

U.S. PATENT DOCUMENTS

| | | | | |
|---|---|---|---|---|
| 8,618,952 | B2* | 12/2013 | Mochizuki | 340/905 |
| 8,639,433 | B2* | 1/2014 | Meis et al. | 701/116 |
| 8,781,958 | B2* | 7/2014 | Michael | 705/39 |
| 8,849,492 | B2* | 9/2014 | Uno | 701/23 |
| 8,849,558 | B2* | 9/2014 | Morotomi et al. | 701/301 |
| 8,854,230 | B2* | 10/2014 | Chen et al. | 340/907 |
| 8,912,978 | B2* | 12/2014 | Szczerba et al. | 345/7 |
| 8,928,495 | B2* | 1/2015 | Hassib et al. | 340/933 |
| 9,002,633 | B2* | 4/2015 | Igodt | 701/414 |
| 2005/0113996 | A1* | 5/2005 | Pillar et al. | 701/36 |
| 2005/0154505 | A1* | 7/2005 | Nakamura et al. | 701/1 |
| 2005/0179527 | A1* | 8/2005 | Schofield | 340/435 |
| 2005/0240342 | A1* | 10/2005 | Ishihara et al. | 701/208 |
| 2005/0278093 | A1* | 12/2005 | Kameyama | 701/36 |
| 2006/0106518 | A1* | 5/2006 | Stam et al. | 701/49 |
| 2007/0158128 | A1* | 7/2007 | Gratz et al. | 180/287 |
| 2007/0200689 | A1* | 8/2007 | Kawazoe et al. | 340/435 |
| 2007/0219709 | A1* | 9/2007 | Ikeda | 701/207 |
| 2007/0230745 | A1* | 10/2007 | Sawaki et al. | 382/104 |
| 2009/0303157 | A1* | 12/2009 | Imai et al. | 345/7 |
| 2010/0073194 | A1* | 3/2010 | Ghazarian | 340/901 |
| 2010/0238009 | A1* | 9/2010 | Cook et al. | 340/439 |
| 2010/0253526 | A1* | 10/2010 | Szczerba et al. | 340/576 |
| 2010/0253539 | A1* | 10/2010 | Seder et al. | 340/903 |
| 2010/0253597 | A1* | 10/2010 | Seder et al. | 345/7 |
| 2010/0289632 | A1* | 11/2010 | Seder et al. | 340/436 |
| 2010/0292886 | A1* | 11/2010 | Szczerba et al. | 701/29 |
| 2012/0038623 | A1* | 2/2012 | Van Raamsdonk | 345/419 |
| 2012/0044352 | A1* | 2/2012 | Aimura et al. | 348/148 |
| 2012/0095646 | A1* | 4/2012 | Ghazarian | 701/36 |
| 2013/0162847 | A1* | 6/2013 | Miyazawa | 348/208.1 |
| 2014/0222368 | A1* | 8/2014 | Kasama | 702/149 |

OTHER PUBLICATIONS

Co-Pending U.S. Appl. No. 14/216,896, by Palan et al., filed Mar. 17, 2014.

Co-Pending U.S. Appl. No. 29/465,202, by Palan et al., filed Aug. 26, 2013.

Mrovlje, Jerney; Vrancic, Damir "Distance measuring based on stereoscopic pictures," 9th International PhD Workshop on Systems and Control: Young Generation Viewpoint; Oct. 3, 2008, 6 pages.

* cited by examiner

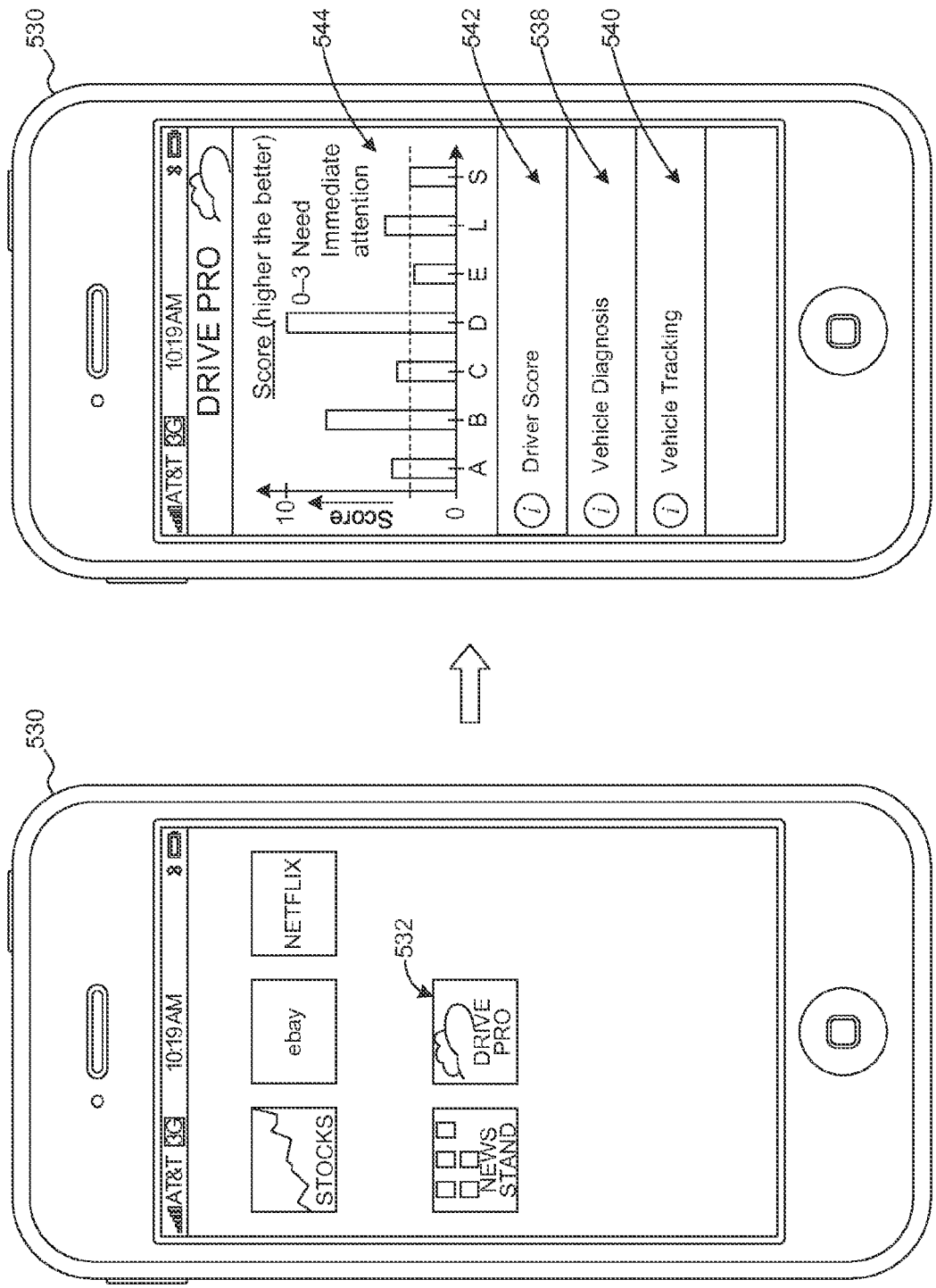

Driving Score (DS)

$$DS = f\{N(A+B+C+D+E+L+S)(T), (VE), (W), (R), (n)\}$$

*Where Driving Score can be calculated as a function of one or more the below listed parameters:*

N = number of times the parameters were above safe levels;

T = Duration for which the parameters were above safe level;

T = 0 if the duration was small, reflecting driver alertness about driving;

D = instance of driving at a safe distance;

L = instance of Lane drifting;

C = instance of un-safe lane Changing;

B = instance of Braking;

A = instance of Acceleration;

S = instance of exceeding speed limit;

E = instance of eyes off the road;

W = weather elements;

n = Age of driver;

R = Driving Records (R);

- Violations / Tickets

- Driving record (accidents)

VE = Vehicle Environment.

*FIG. 6*

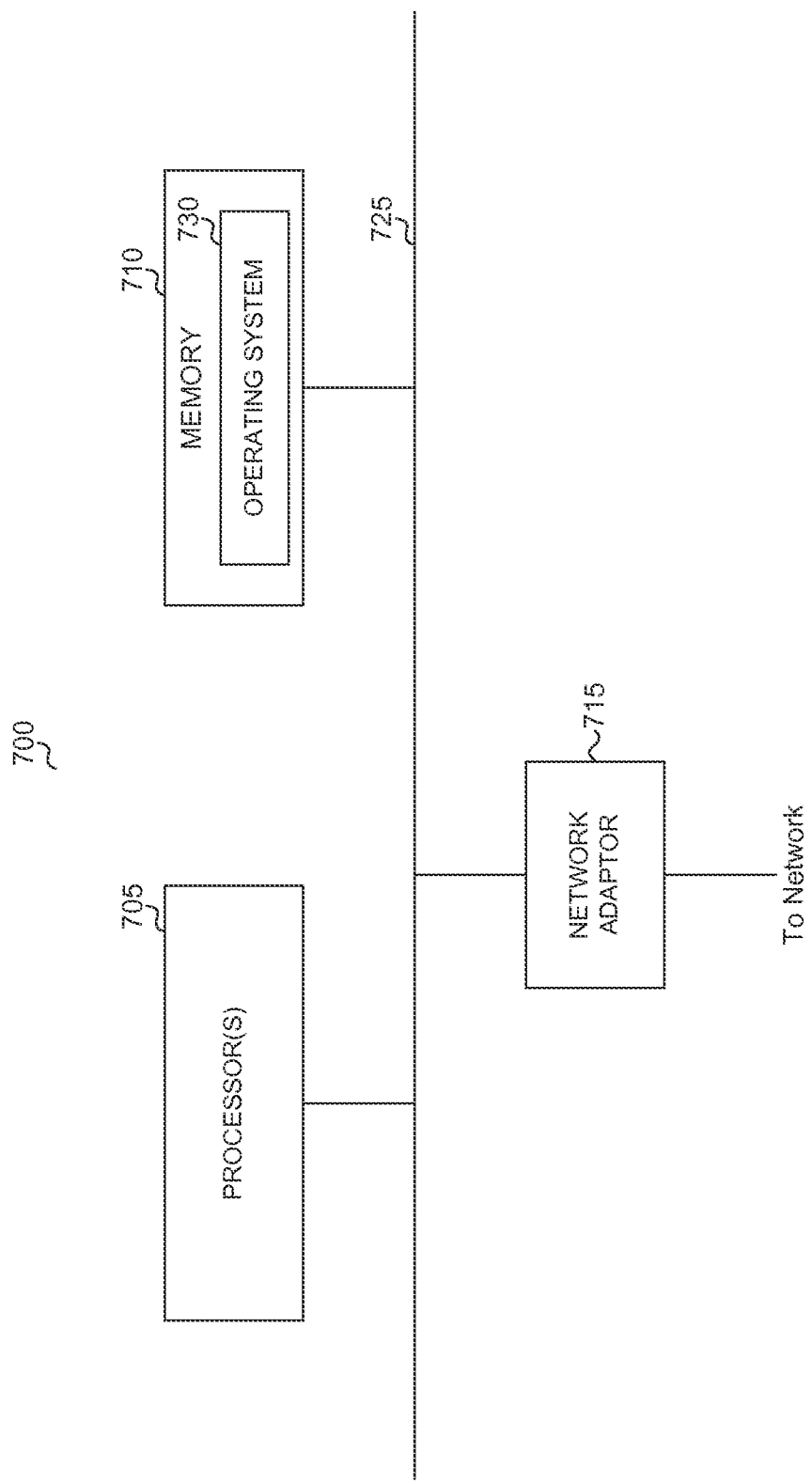

AFTER MARKET DRIVING ASSISTANCE SYSTEM

FIELD

The present invention generally relates to a vehicle driving assistance system configured to assist a driver with respect to the operation of a vehicle.

BACKGROUND

Motor vehicle drivers are required to negotiate traffic safely when traveling on public roads. Having an awareness of the presence of neighboring vehicles and objects is particularly important when changing lanes, either to the left or the right, or simply when operating the motor vehicle. For example, a safety device capable of automatically detecting the presence of a target vehicle in the blind spot and informing the driver whether the lane is clear or occupied will increase safety by reducing the need for the driver to take her eyes off the road while changing lanes.

What is needed is a driving assistance system that improves safety and provides driver with performance assessments while at the same time is simple, inexpensive, and reliable (i.e. not producing an unacceptable level of false detection events). Among teaching a variety of other things, certain aspects of the inventions herein have embodiments which may satisfy one or more of the above-described issues.

SUMMARY

Introduced here are methods, systems, paradigms and structures for providing driving and vehicle related assistance to a driver of a vehicle. In one embodiment, a system comprises a speed detection system communicating with a first controller of the vehicle to determine a speed of the vehicle, where the first controller monitors and gathers data indicative of the speed of the vehicle. The system further comprises a sensing system having at least one first sensor affixed to the vehicle to monitor and gather information associated with a monitoring zone defined along a region proximate to the vehicle. The sensing system further includes a first transmitter for transmitting the gather information periodically. The system comprises a display module located within the interior of the vehicle and a second controller in communication with the speed detection system, the sensing system and the display module.

Upon receiving the gathered information from the sensing system, the second controller in the system utilizes the received information to detect the presence and the proximity of an object in the monitored zone of the vehicle. Upon detecting said object in the monitored zone of the vehicle, the second controller of the system determines the appropriateness of providing a warning to a driver of the vehicle regarding said object. The appropriateness of providing the warning to the driver regarding said object is determined as a function of the proximity of said object to the vehicle and the speed of the vehicle. Upon a determination that the warning is appropriate, the second controller of the system displays the warning, through the display module, to the driver of the vehicle regarding the presence and the proximity of said object.

Some embodiments of the invention have other aspects, elements, features, and steps in addition to or in place of what is described above. These potential additions and replacements are described throughout the rest of the specification.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 5B-5C provides an illustration of how a smart phone can be utilized to retrieve and view the various information provided by the cloud platform to the driver;

FIG. 6 provides an illustrative example of a function that can be used to quantify the various driver and vehicle related information received by the cloud platform from a plurality of sources and compute the driving score for the driver; and FIG. 7 is a block diagram of a processing system that can implement operations of the present invention.

DETAILED DESCRIPTION

Hereinafter, descriptions will be provided on embodiments of the present invention with reference to the drawings.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this section.

Figure 1:
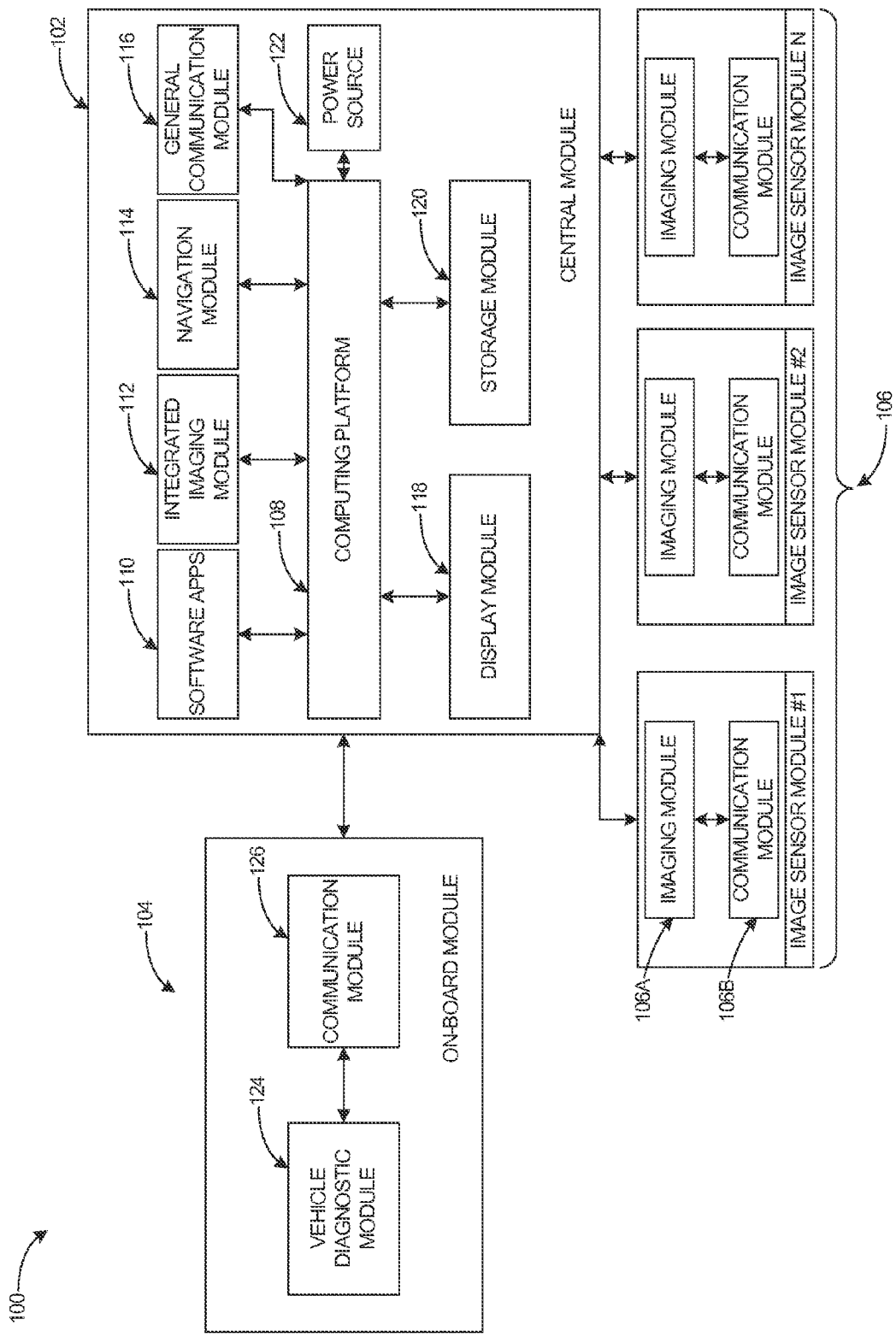
FIG. 1 is a schematic diagram illustrating an embodiment of a driver and vehicle monitoring and warning system (also referred to as the information system)

FIG. 1 and the following discussion provide a brief, general description of a representative environment in which the techniques described herein can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

In some instances, the network is the Internet, allowing a central module 102 (with, for example, WiFi capability) to access web content offered through various web servers using a general communication module 116 (discussed in detail below). In some instances, especially where the central module 102 is used to access web content through the network (e.g., when a 3G or an LTE service of the communication module 116 is used to connect to the network), the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

FIG. 1 is a schematic diagram illustrating an embodiment of the auto (also referred to as "vehicle") and driver (also referred to as "user") monitoring and warning device 100 (also referred to as the "information system") according to the present invention. In one embodiment, the information system 100 can be installed in a vehicle to assist the driver by providing information related to safety, driver performance, general vehicle diagnostics, etc.

In some embodiments, the information system 100 includes a central module 102, which comprises a computing platform 108, as illustrated in the diagram. The computing platform 108 includes a microcomputer. In one embodiment, the microcomputer can be a Graphics Processing Unit (GPU). In some embodiments, the central module 102 includes a power source 122 to support the power requirements of the computing platform 108 and the various other modules included in the central module 102. In some embodiments, the power source 122 could include a battery pack to support the power needs of the central module 102 even when other power supplies are disabled.

In some embodiments, the computing platform 108 of the central module 102 runs an operating system (OS) to manage the various resources (including the microcomputer) associated with the information system 100. In one instance, the OS is an Android-based OS. In some embodiments, the computing platform 108 runs one or more applications (Apps) that are supported by the OS of the computing platform 108. For example, the Apps could be Android-based Apps for an Android-based OS.

In one instance, the Apps can be any driver-assistance Apps, such as Navigation Apps, Gas-station finder Apps, any travel-related Apps, etc. In some embodiments, the central module 102 includes a navigation module 114 that could be utilized by the Navigation Apps to provide navigation services to the user. For example, the navigation module 114 can include a Global Position System (GPS) receiver to provide present user location information to the Navigation Apps, which is used by the Navigation Apps to provide directions to the user from the user's present location.

The central module 102 further includes a display module 118 that can be used by a user to interact with the information system 100, including the various Apps running on the computing platform 108. In one instance, the display module 118 can include a touch-screen to enable the user to interact with the information system 100 using a touch-based interaction. In another instance, the display module 118 can include additional buttons on the central module 102, which, when activated, enables the user to interact with the information system 100 and the various Apps running on the computing platform 108.

In some embodiments, the central module 102 communicates with other modules of the information system 100 through a general communication module 116. As discussed earlier, the general communication module 116 may include one or more dedicated radios chips to support 3G and/or an LTE service to connect to the network, where the network may be any type of cellular, IP-based or converged telecommunications network, including but not limited to Global System for Mobile Communications (GSM), etc. The general communication module 116 may further include one or more dedicated radios chips to support WiFi, Bluetooth, and other short range communication systems. For example, the central module 102 may communicate with an imaging module #1 106 through the general communication module 116 using WiFi.

In some embodiments, the central module 102 may communicate with any on-board computing module 104 integrated within the vehicle the information system 100 is installed in. In some instances, the on-board computing module 104 may include vehicle diagnostics module 124, which in turn includes one or more sensors to monitor performance of the vehicle. The vehicle diagnostics module 124 may further include a microcomputer to periodically gather the sensed information from the sensors and store the information in an on-board memory, where the on-board memory may include a combination of volatile and non-volatile memory. Here, the gathered information could include vehicle performance information, such as speed of the vehicle, etc., and general vehicle related information, such as fuel level, fuel type, etc.

The on-board computing module 104 may further include a communication module 126 to communicate with the general communication module 116. In some embodiments, the communication module 126 gathers any information requested by the central module 102 (through the general communication module 116) by communicating with the vehicle diagnostics module 124. The communication module 126 and the vehicle diagnostics module 124 may communicate with each other using any industry standard protocol, such as On-Board Diagnostics ∥ (OBD2) protocol, etc. In one embodiment, the communication module 126 may transmit the requested information to the central module 102 by communicating with the general communication module 116 using any well-known wireless communication protocols, such as TCP/IP protocol (over a WiFi connection) or a Bluetooth Network Encapsulation protocol (BNEP) (over a Bluetooth connection).

In some embodiments, the central module 102 includes an integrated imaging module 112 used to capture images to monitor the environment of the driver and the vehicle. In some embodiments, the integrated imaging module 112 could include one or more cameras, where each camera could be of a different type. For example, the image sensor module 106A could include two cameras, one a visible light camera (e.g., any standard digital camera) and the other an infra-red camera. The images provided by these cameras allow the information system 100 to infer additional information regarding the environment the vehicle is in. In some embodiments, the integrated imaging module 112 could include at least two standard cameras with each facing in a different direction. For example, one of the cameras could be facing the driver and be used to monitor the activities of the driver while the other camera could be facing the road and be used to monitor the proximity of the vehicle for objects (e.g., a car in the front of the vehicle, a pedestrian, etc.).

In some embodiments, the central module 102 is further configured to receive an image captured by one or more imaging modules #1-#N 106 (also collectively referred to as "imaging module", where the imaging module could include one or more imaging modules #1-#N). The imaging module 106 could include an image sensor module 106A to capture images and a communication module 106B to transmit the captured image to the central module 102. In some embodiments, similar to the integrated imaging module 112, the image sensor module 106A could include one or more cameras, where each camera could be of a different type. For example, the image sensor module 106A could include two cameras, one a visible light camera (e.g., any standard digital camera) and the other an infra-red camera. The images provided by these cameras allow the information system 100 to infer additional information regarding the environment the vehicle is in. Further, in some embodiments, the image sensor module 106A could include at least two standard cameras, set at appropriate angles and separation from each other, to capture stereoscopic images (e.g., 3D-images). In some embodiments, the image sensor module 106A can be any aftermarket stand-alone cameras units. In some embodiments, the image sensor module 106A can include any pre-installed cameras within the vehicle, such as any cameras installed on the rear (e.g., bumper) of the vehicle, used to provide services such as parking assistance, etc.

In some embodiments, the imaging module 106 transmits the captured image to the central module 102 using the communication module 106B, where the communication module 106B communicates with the general communication module 116 in the central module 102 to perform the transmission. In one instance, the communication module 106B communicates with the general communication module 116 using any well-known wireless communication protocols, such as TCP/IP protocol (over a WiFi connection) or BNEP (over a Bluetooth connection).

In some embodiments, the central module 102 further processes the received image along with the vehicle related information (gathered from the on-board computing module 104) and provides information and warnings (if necessary) to the user through the display module 118. In one instance, the central module 102 could utilize the received images and the gathered vehicle data to determine if a vehicle is in imminent danger of a forward collision and alert the driver of the vehicle of such a danger by displaying warning messages through the display module 118. Further details of one such implementation of a detection and warning system (as performed by the information system 100) are discussed in detail with reference to FIG. 2 and FIG. 3.

In another instance, the central module 102 could utilize the received images and the gathered vehicle data to determine if warnings relating to possible lane drifting of the vehicle, lane departure of the vehicle, pedestrian or biker in proximity of vehicle, objects in blind spot of vehicle, exceeding allowed speed limits, tail-gating violation, etc. Further details of one such implementation of a detection and warning system (as performed by the information system 100) which performs one or more of the above functions are discussed in detail with reference to FIG. 2-FIG. 4.

In some embodiments, the central module 102 stores the various warnings and gathered vehicle data in a storage module 120. In one instance, the stored data could be used to perform various driver and vehicle related analytics, where such analytics could provide the driver (or any interested party, possibly, authorized by the driver) with insight into the driver's driving practices and any preventive maintenance that might be necessary for the vehicle. In some embodiments, the central module 102 performs the various driver and vehicle related analytics and provides the results to the driver. The results could either be displayed to the driver through the display module 118 or be transmitted to any devices (e.g., a smart phone or any computing device) associated with the driver through the network. For example, an App in a smart phone associated with the driver may be configured to receive the results from the central module 102 through the network. The driver can then retrieve the results through their smart phone even when the central module 102 is physically inaccessible to the driver.

In some embodiments, the central module 102 transmits the gathered data to any requesting service and allows the requesting service to perform the various driver and vehicle related analytics and provide the results to the driver. In one instance, the requesting service can be a cloud-based service with an associated App installed on a computing device (e.g., the driver's smart phone) of the driver. The cloud-based service can perform the analytics and provides the results to the App, which can then be retrieved by the driver through the computing device. Additional details on the various data analytics performed on the gathered data and how the results of the analytics are distributed is discussed in detail with reference to FIG. 5-FIG. 7.

Descriptions will now be provided of the various methods implemented by the information system 100 to perform the various functions discussed above.

Figure 2:
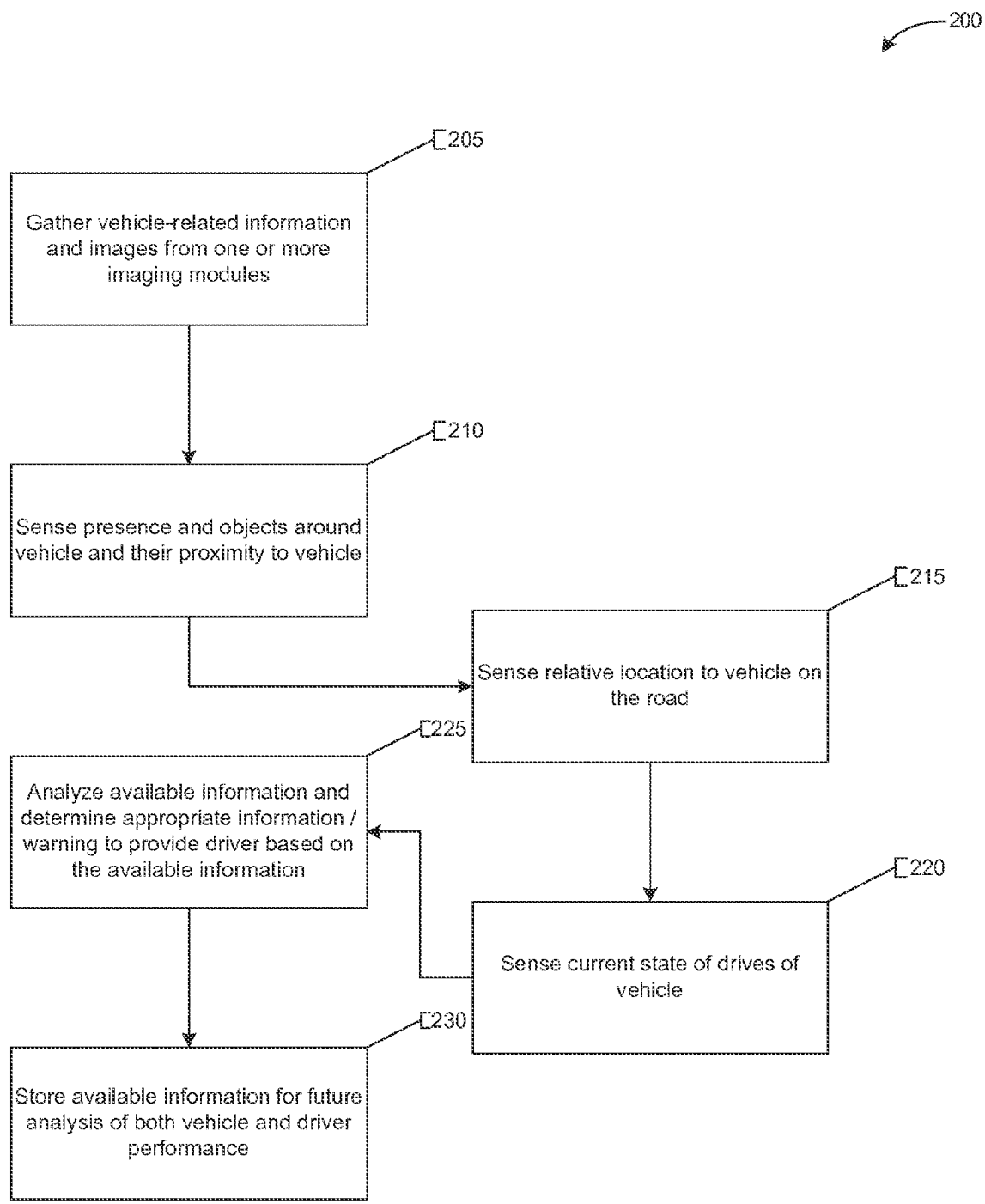
FIG. 2 is a flow chart illustrating a method implemented by the information system to monitor the driver and vehicle and provide any warnings to the driver if necessary.

FIG. 2 is a flow chart illustrating a specific method 200 implemented by the information system 100 to monitor the driver and vehicle and provide any warnings to the driver if necessary.

In step 205 of the method 200, the information system 100 receives images from the one or more imaging modules 106 and the integrated imaging module 112 and other vehicle related information from the on-board computing module 104 of the vehicle. In some embodiments, the information system 100 receives a set of images captured periodically by the imaging modules 106, 112 within a given time period. Similarly, the information system 100 also receives vehicle related information from the on-board computing module 104 measured periodically over the given time period. Here, the period of capturing images and gathering vehicle related information can be different.

Using the information received in step 205, in step 210, the information system 100 senses the presence of any objects in the proximity of the vehicle and when possible, the proximity of any such objects. In one embodiment, the central module 102 of the information system 100 compares a given set of images captured from a given imaging module 106 to determine if there are any objects approaching within the proximity of the vehicle along the section of the vehicle being monitored by the imaging module 106. For instance, if the given set of images vary and if the image captured last in the given set of images include an object that was not present in at least some of the prior images, the central module 102 can flag that the object is now approaching within the proximity of the vehicle.

In some embodiments, the central module 102 can further distinguish background objects that are simply captured as the vehicle is in motion from those objects of interest, such as another vehicle, a pedestrian, a biker, etc., whose actions can affect the safety and response of the driver of the vehicle. In some embodiments, the central module 102 can further parse the background objects and identify relevant objects of interest such as a traffic markings (e.g., lane markings), traffic signs (e.g., stop sign), etc. which affect the driver's safety and response.

In one embodiment, the central module 102 can identify objects of interest by parsing each image into a subset of possibly distinct objects and comparing the outline of each such possibly distinct object with the outlines of various objects of interest to determine the presence of such objects of interests. There are many well known methods to parse any image into subset of possibly distinct objects and to compare similarity of two objects based on their edges (i.e. outline). Any such method could be used by the central module 102 to identify the objects of interest.

In some embodiments, the central module 102 can further determine the proximity of any object of interest. As discussed earlier, in one embodiment, the central module 102 receives sets of stereoscopic (3D) images from each of the imaging modules 106, which can be used to measure the proximity (i.e. distance) of any object of interest. There are many well known methods to determine proximity of an object based on its stereoscopic (3D) images. One such method is disclosed in the non-patent literature, titled "Distance measuring based on stereoscopic pictures," by authors Jerney Mrovlje and Damir Vrancic. Any of these well known methods could be used by the central module 102 to determine the proximity of an object of interest. In some embodiments, the central module 102 utilizes the proximity of any object within the vicinity of the vehicle to provide warnings such as possible forward collision, tail-gating, blind spot, pedestrian or biker in vicinity, etc. One such method that utilizes the gathered data to determine possible warning to provide a driver is explained in detail with reference to FIGS. 3 and 4.

In step 215 of the method 200, the information system 100 utilizes the images from the integrated imaging module 112 and the one or more imaging modules 106 to determine the relative location of the vehicle with respect to any lanes on the road being used by the vehicle. In some embodiments, the central module 102 of the information system 100 receives a set of images captured periodically, within a given time period, by a road facing camera integrated within the imaging module 112. As discussed earlier, the central module 102 can determine traffic markings such as lanes on the road from the captured images from the road facing camera.

Further, the central module 102 can identify a location on the front of the vehicle from the captured images, which can then be utilized to measure the changing distance between the lanes and the identified location on the vehicle. In one instance, multiple locations can be identified on the vehicle (such as one of either side of the vehicle) and each identified location could be positioned closer to one of the sides of the vehicle. The central module 102 can then measure the distance of the vehicle from lane markings on either side of the vehicle. In some embodiments, the central module 102 utilizes the determined relative location of the vehicle on the road to determine if the vehicle is lane drifting or lane changing. One such method that utilizes the gathered data to determine lane drifting or lane changing is explained in detail with reference to FIG. 5.

In step 220 of the method 200, the information system 100 utilizes the images from the integrated imaging module 112 and the one or more imaging modules 106 to determine the activities of the driver when driving the vehicle. In some embodiments, the central module 102 of the information system 100 receives a set of images captured periodically, within a given time period, by a driver facing camera integrated within the imaging module 112. As discussed earlier, the central module 102 can determine objects of interest, such as face, eyes and hands of the driver, etc.

In some embodiments, the central module 102 performs facial recognition (using any of the well known methods in the art) to identify the driver and creates and associates a driver profile with each new identified driver of the vehicle. The central module 102 utilizes the driver profile to store the various information gathered by the information system 100 in an appropriate driver profile associated with the driver (determined based on the picture of driver associated with driver profile), helping the various data analytics performed to be customized to the driver based on their specific information stored in their driver profile.

In some embodiments, the central module 102 compares the set of images captured periodically, within a give time frame, from the driver facing camera and determines, when possible, information such as whether the driver's eyes are closed (i.e., when the eyes are not covered by glasses) for extended period of time, whether the driver's eyes are looking away from the road (e.g., looking at a phone or turned away from the camera), etc. In some embodiments, the central module 102 monitors the eyes and hands of the driver to determine the alertness of the driver, such as whether the driver is drowsy, whether the driver is distracted with their mobile phone, etc., and provides appropriate warnings when necessary.

In step 225, the central module 102 of the information system 100 utilizes the information gathered in steps 205-220 to determine (as discussed above) the appropriate information and warnings to provide the driver. Some of the warnings and information provided by the information system 100 are discussed in detail with reference to FIGS. 3-6. In step 226, the central module 102 of the information system 100 stores the gathered data and all the results of steps 205-225. In one instance, the data is stored in the storage module 120. In another instance, as discussed earlier, at least a portion of the data is stored in a cloud-based service that allows the driver to access the stored information even when the information system 100 is physically inaccessible to the driver.

Figure 3A:
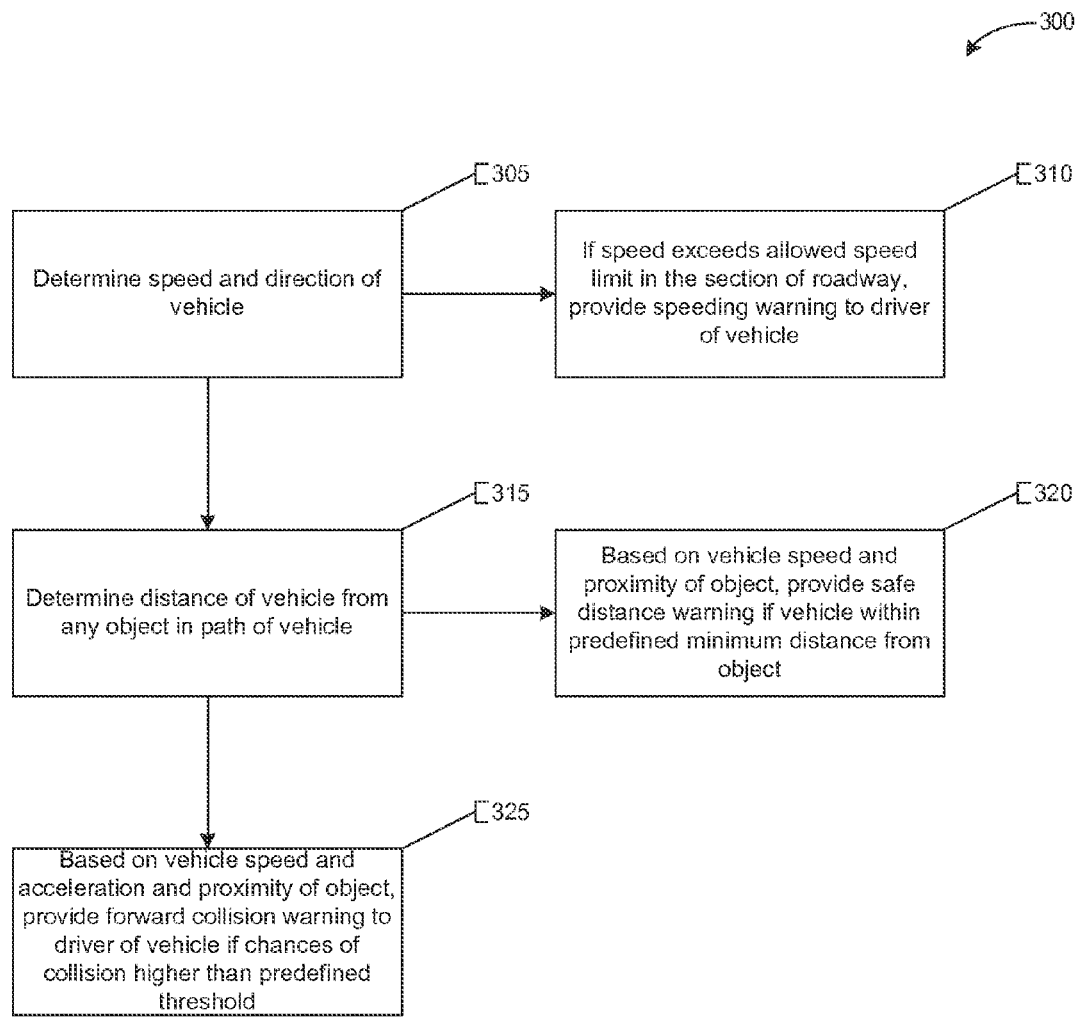
FIG. 3A is a flow chart of a method that utilize the various gathered data to determine the possible warnings, such as collision warning, speeding warning, tail-gating warning, etc., to provide the driver of the vehicle.

FIG. 3A is a flow chart of a specific method 300 that utilize the various gathered data (discussed above with reference to FIG. 2) to determine the possible warnings, such as collision warning, speeding warning, tail-gating warning, etc., to provide the driver of the vehicle. Further, FIG. 3D provides an illustrative example of a vehicle with at least some of the modules of the information system 100 integrated within the vehicle to show how the modules interact with each other to perform the various steps of the method 300.

In step 305 of the method 300, the information system 100 determines the speed and acceleration of the vehicle. In some embodiments, the central module 102, 304 of the information system 100 gathers the speed of the vehicle 302 from the on-board computing module 104 (as described above). Further, the central module 102, 304 determines the acceleration of the vehicle 302 based on the speed of the vehicle 302 gathered over a given time period. For example, if the on-board computing module 104 periodically senses and stores the speed of the vehicle 302, the central module 102, 304 can retrieve the current speed and the last measured speed of the vehicle 302 and the time period that had lapsed between the two speed measurements to determine the acceleration/deceleration of the vehicle 302.

In step 310 of the method 300, the information system 100 determines the speed limit of the road the vehicle 302 is traveling on and provides a speeding warning when the determined speed of the vehicle 302 exceeds the allowed speed limit. The warning can be a message displayed to the driver through the display module 118. In some embodiments, the central module 304 of the information system 100 determines the speed limit of the road by parsing and identifying traffic signs from the images captured using the various imaging modules 106, 306-314.

In another embodiment, the central module 102, 304 determines the speed limit of the road by utilizing querying a database with such information, where such a database could be partially locally stored on the central module 304 or be remotely stored on a cloud-based service. For example, the central module 304 can provide the current location of the vehicle to an App, installed on the central module 304, to determine the speed limit of the road. The App can be configured to query a remote database (using the communication module 116) with the location information and retrieve the speed limit of the road the vehicle is currently traveling on.

In step 315 of the method 300, the information system 100 determines the proximity of any object in the vicinity of the vehicle 302 to determine if any warnings of the object's presence need to be provided to the driver. In some embodiments, the central module 302 utilizes the images from the road facing camera in the integrated imaging module 306 to determine if any object is in the path of the vehicle 302 (e.g., if the object falls within zone "A" 322 of the vehicle 302). Further, if any object is detected in the path of the vehicle 302, the central module 302 determines the proximity of the object utilizing the various techniques discussed earlier with reference to FIG. 2.

In step 320 of the method 300, the information system 100 determines whether the driver of the vehicle 302 is following a moving object (e.g., another vehicle) at a safe distance. In some embodiments, the central module 302 determines whether the object in the path of the vehicle is moving before determining whether the vehicle 302 is following the moving object at a safe distance. In one instance, the central module 304 determines the object in the path of the vehicle is in motion if the relative distance (i.e. proximity) between the object and the vehicle is changing at a different rate than the change expected when the object is not in motion.

In some embodiments, when the object in the path of vehicle 302 is in motion, the central module 304 determines if the proximity between the vehicle 302 and the object in the path is less than a predefined minimum safe following distance and displays a warning to the driver when the vehicle is following within the allowed distance. In some embodiments, the central module 304 determines the minimum safe following distance as a function of the speed of the vehicle 302 and a minimum distance required to stop the vehicle at a given speed. For example, when the vehicle 302 is traveling at 25 mph, the vehicle 302 can be stopped to a stand-still within 20 yards. So, a safe following distance could be set at 25 yards before the warning is provided to the driver.

In step 325 of the method 300, the information system 100 determines whether the driver of the vehicle 302 is in imminent danger of collision with the object in the path of the vehicle and whether any warnings or other preventive steps should be taken. In some embodiments, based on the speed and the acceleration of the vehicle 302 and the proximity of the object in the path of the vehicle 302, the central module 302 determines whether the vehicle 302 is in imminent danger of collision with the object and whether any warnings or other preventive steps should be taken.

In one instance, the central module 302 determines the vehicle 302 is in imminent danger of collision with the object when the vehicle 302 cannot be safely stopped (i.e. without colliding with the object) if the driver continues to drive the vehicle 302 at the current speed and acceleration for a predefined time period. In one embodiment, the central module 302 can determine the predefined time period as a function of the proximity of the object to vehicle and the safe stopping distance required for the vehicle at the current speed and acceleration.

In some embodiments, the central module 302 starts displaying a warning to the driver, through the display module 118, before the driver drives the vehicle 302 for a time period greater than the predefined time period at or greater than the current speed and acceleration. In some embodiments, the central module 302 can interact with other safety modules integrated within the vehicle through the on-board computing module 104 (or equivalent) to enable preventive steps in the event of the imminent collision. For example, the central module 302 can interact with a safety module that controls the seat belts to tighten them, helping mitigate injuries in the event of a collision. Similarly, the central module 304 can interact with other safety modules such as airbags, automatic braking systems, etc. to prevent or mitigate injuries from a collision.

Figure 3B:
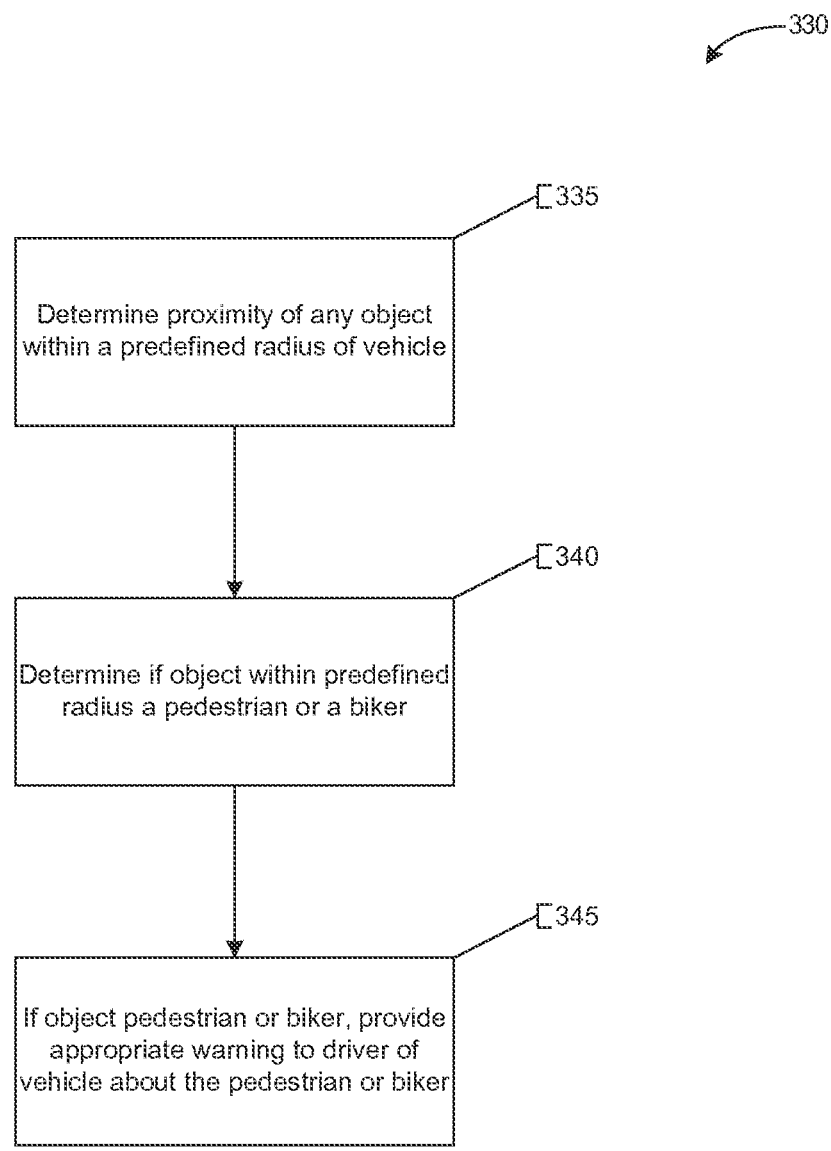
FIG. 3B is a flow chart of a method that utilize the various gathered data to determine the possible warnings, such as pedestrian warning, biker warning, etc., to provide the driver of the vehicle.

FIG. 3B is a flow chart of a specific method 330 that utilize the various gathered data (discussed above with reference to FIG. 2) to determine the possible warnings, such as pedestrian warning, biker warning, etc., to provide the driver of the vehicle.

In step 335 of the method 330, the information system 100 determines if there are any object within the vicinity of the vehicle 302 before determining whether to provide any warning to the driver of the vehicle 302. In some embodiments, the central module 304 utilizes the images from the imaging modules 306-316 to determine if any object is in the vicinity of the vehicle 302 (e.g., if the object falls within any of the zones "A", "B", "C" or "D" 316-324 of the vehicle 302). In one instance, the vicinity of the vehicle can be the maximum distance the imaging modules 306-316 can capture an image with identifiable objects. Further, if any object is detected in the vicinity of the vehicle 302, the central module 304 determines the proximity of the object utilizing the various techniques discussed earlier with reference to FIG. 2.

In step 340 of the method 330, the information system 100 determines if any of the objects within the vicinity of the vehicle 302 is a biker or a pedestrian or any other object of interest, such as wild animals, etc., which could potentially affect the safety of the driver and the vehicle. As discussed with reference to FIG. 2, in some embodiments, the central module 304 determines the object type (e.g., biker, pedestrian, etc.) by parsing and identifying the objects from the images and comparing the outlines (i.e. edges) of such objects with pre-identified outlines of known objects.

In step 345 of the method 330, the information system 100 determines the appropriate warning to provide the driver of the vehicle 302 when a biker or a pedestrian or any other object of interest is within the vicinity of the vehicle 302. In some embodiments, the central module 304 determines the location of the object relative to the position of the driver (i.e. whether the object is to the left or right of the driver) and provides warnings accordingly. In some embodiments, the central module 304 determines the relative location of the object to driver based on the viewing angle of the imaging module 306-314 that captured the picture of the object.

In one embodiment, each imaging module 306-314 of the information system 100 can utilize a unique identifying number communicated with each image, which are further labeled on the exterior of the imaging modules 306-314. In one instance, the driver can be required by the central module 304 to provide the relative location of each camera with respect to the central module 304. In another instance, the central module 304 can capture an image of the interior of the vehicle (e.g., using the driver facing camera) with the various installed imaging modules 306-314 and determine the location of each imaging module 306-314 based on their exterior markings. Based on the source of the image with the object, the central module 304 warns the driver of the location and proximity of the object to the vehicle 302.

Figure 3C:
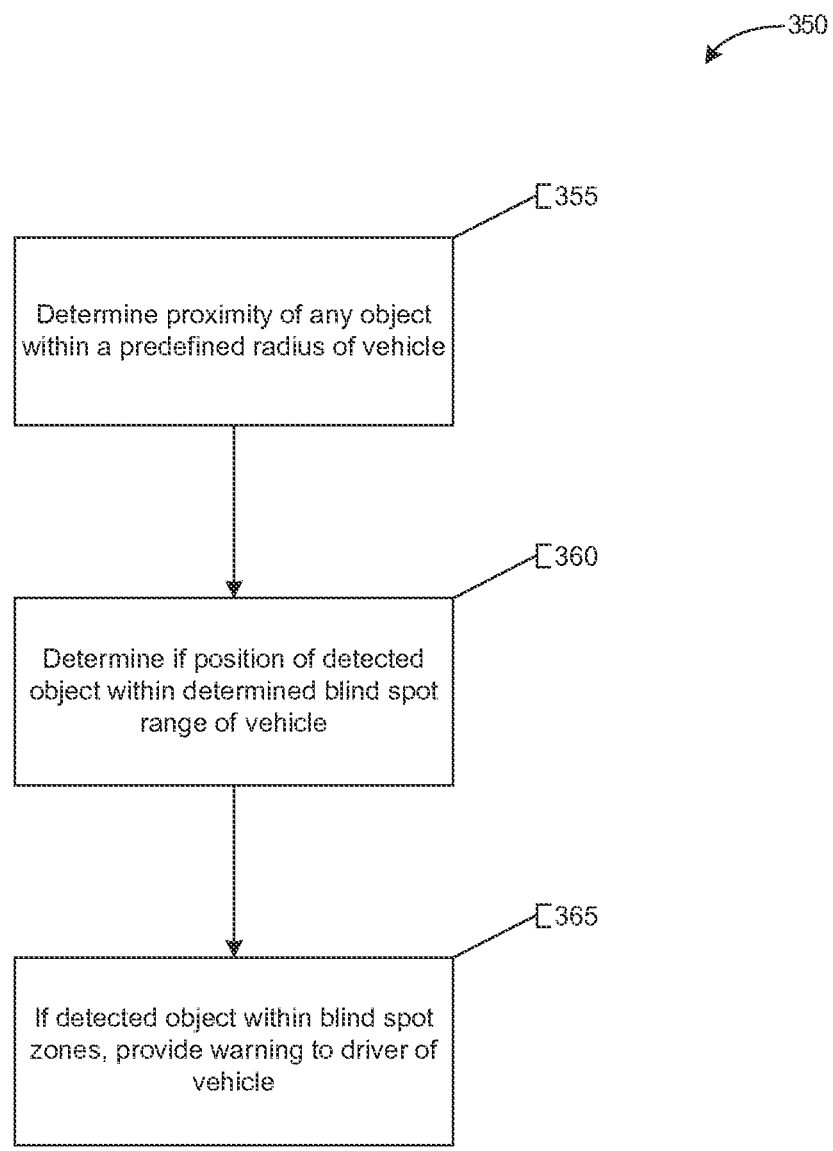
FIG. 3C is a flow chart of a method that utilize the various gathered data to determine the possible warnings, such as blind-spot warning, etc., to provide the driver of the vehicle.
Figure 3D:
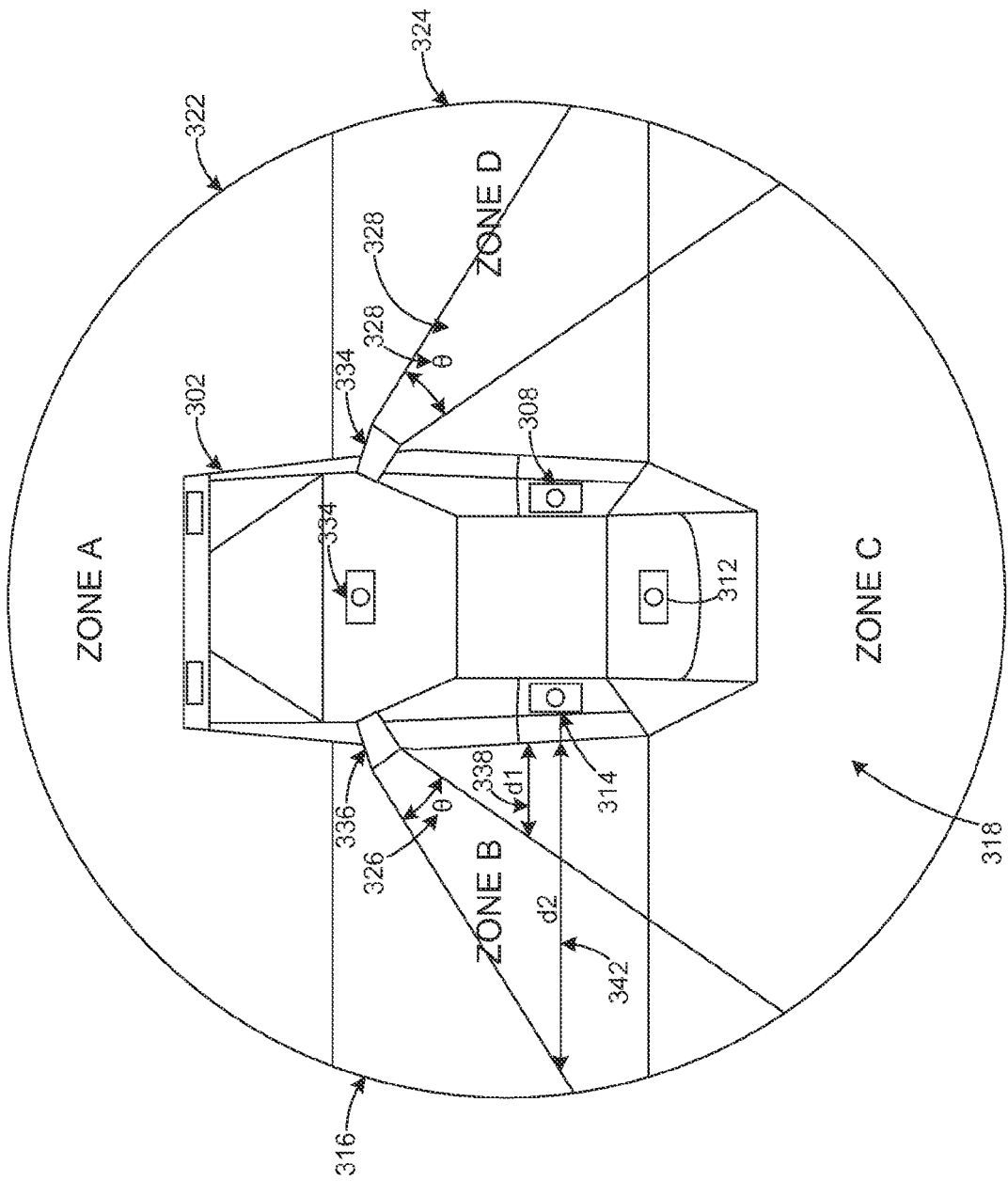
FIG. 3D provides an illustrative example of a vehicle with at least some of the modules of the information system integrated within the vehicle to show how the modules interact with each other to perform the various steps of the method.

FIG. 3C is a flow chart of a specific method 350 that utilize the various gathered data (discussed above with reference to FIG. 2) to determine the possible warnings, such as blind-spot warning, etc., to provide the driver of the vehicle.

In step 355 of the method 350, the information system 100 determines if there are any object within the vicinity of the vehicle 302 before determining whether to provide any warning to the driver of the vehicle 302. In some embodiments, the central module 304 utilizes the images from the imaging modules 308-316 to determine the proximity of objects, if any, within the vicinity of the vehicle's 302 blind spot (e.g., if the object falls within any of the zones "B" and "D" 316, 324 of the vehicle 302). Here, a blind spot in the vehicle is defined as an area around the vehicle that cannot be directly observed by the driver using any of the mirrors while at the controls. In one embodiment, the central module considers the portions 326, 328 of zone "B" 316, "C" 318, and "D" 324 that are within a predefined angle "θ" 332 from the side mirrors 334, 336 of the vehicle, consisting of portion of area around the vehicle that cannot be directly observed by the driver using any of the mirrors, as a portion of the blind spot of the vehicle.

In step 360 of the method 350, the information system 100 determines if the detected object falls within the vehicle's 302 blind spot. In some embodiments, the central module 304 utilizes the proximity of objects to the vehicle 302 to determine if the detected object falls within the vehicle's 302 blind spot. In some embodiments, based on the blind spot area around the vehicle, a distance "d1" 338 and "d2" 342 along each point on the blind spot area around the vehicle is pre-determined and stored in the central module 304. By utilizing the pre-determined distances "d1" 338 and "d2" 342 and the proximity of the object to the vehicle, the central module 304 can determine if object is within the vehicle's blind spot.

In step 365 of the method 350, the information system 100 determines the appropriate warning to provide the driver of the vehicle 302 when an object is within the blind spot of the vehicle 302. In some embodiments, the central module 304 determines the location of the object relative to the position of the driver (i.e. whether the object is to the left or right of the driver) and provides warnings accordingly. As discussed above, in some embodiments, based on the source of the image with the object, the central module 304 warns the driver of the location and proximity of the object in the blind spot of the vehicle 302.

Figure 4A:
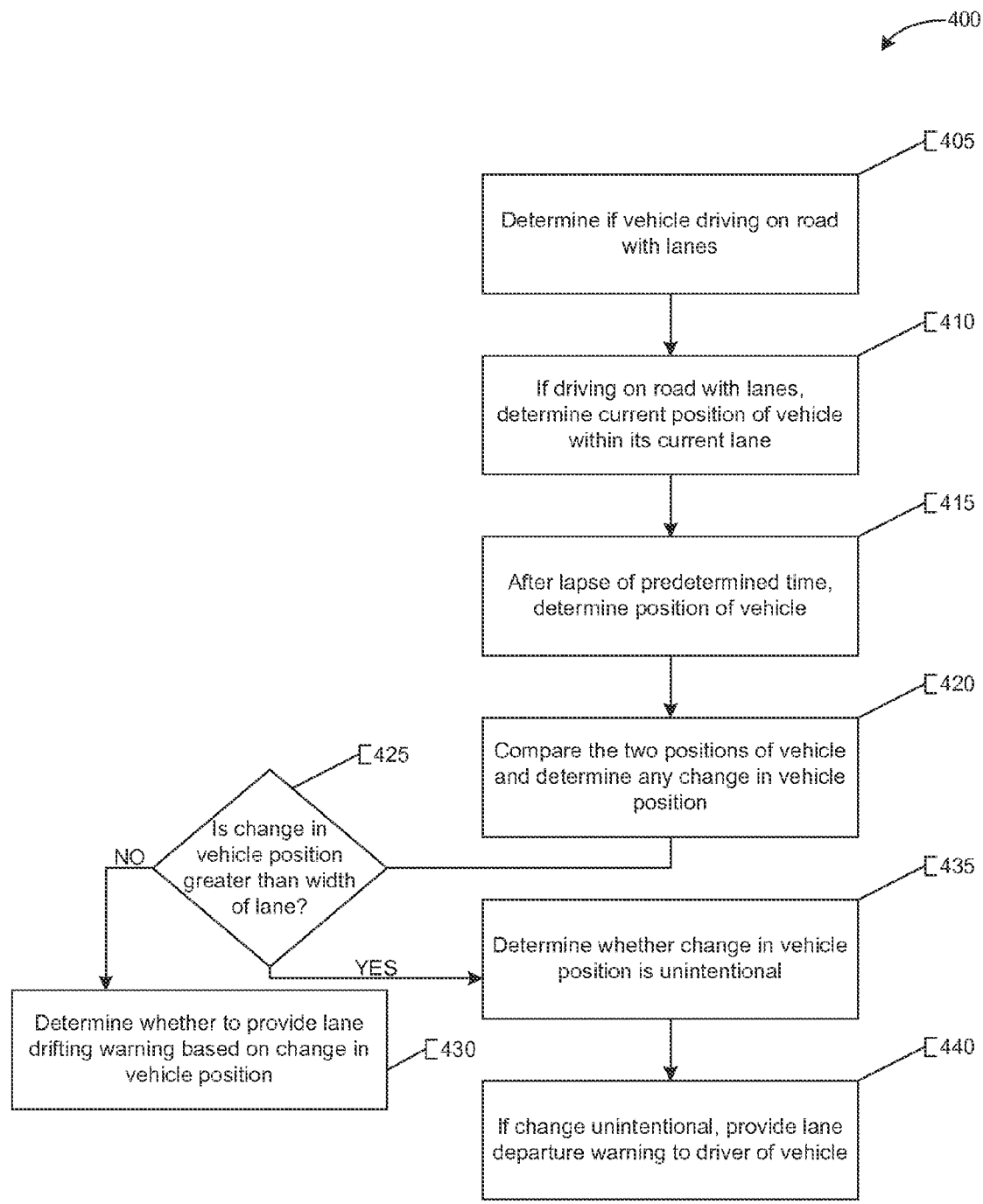
FIG. 4A is a flow chart of a method that utilize the various gathered data to determine the possible warnings, such as land drifting, unsafe lane changing, etc., to provide the driver of the vehicle.
Figure 4B:
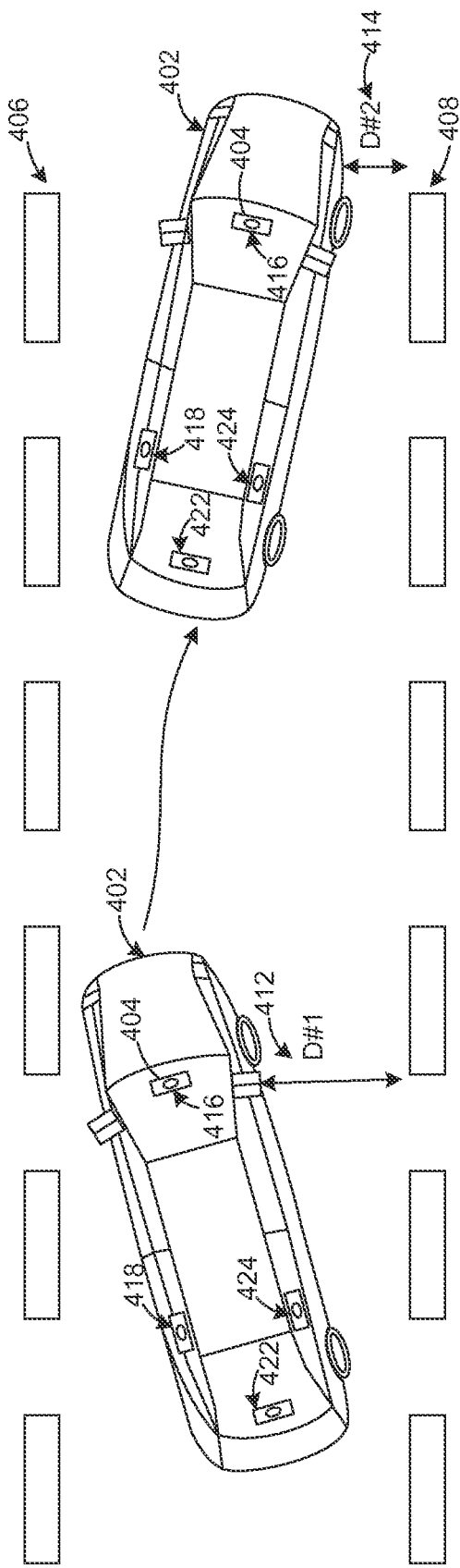
FIGS. 4B-4C provide an illustrative example of a vehicle's travel within lanes and the various measurements gathered to determine the vehicle's drift, lane change, etc.
Figure 4C:
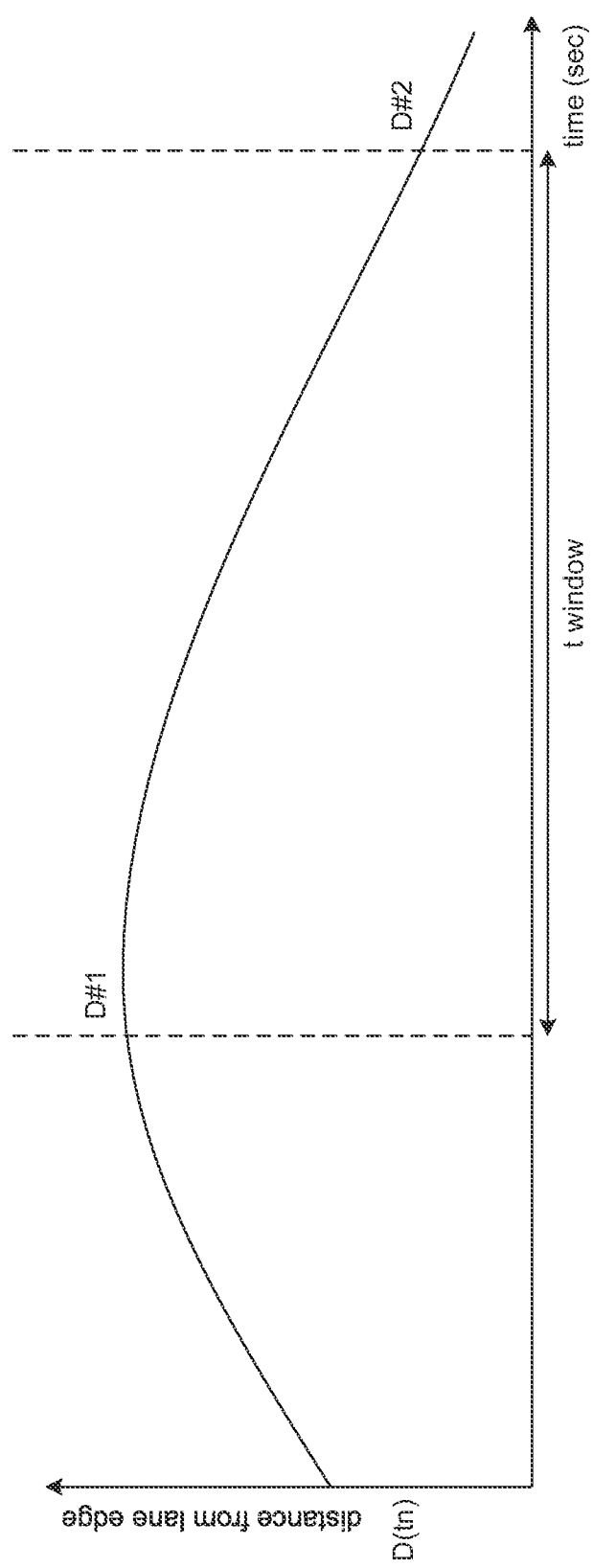

FIG. 4, which includes FIGS. 4A-4C, describes the method that utilize the various gathered data (discussed above with reference to FIG. 2) to determine the possible warnings, such as land drifting, unsafe lane changing, etc., to provide the driver of the vehicle.

FIG. 4A is a flow chart of a specific method 400 that utilize the various gathered data (discussed above with reference to FIG. 2) to determine the possible warnings, such as land drifting, unsafe lane changing, etc., to provide the driver of the vehicle. Further, FIGS. 4B-4C provide an illustrative example of a vehicle's 404 travel within lanes 406, 408 and the various measurements gathered to determine the vehicle's drift, lane change, etc.

In step 405 of method 400, the information system 100 determines if there are any lane markings on the road the vehicle 402 is traveling on, where the lane markings are used to determine a vehicle's lane drifting, unsafe lane changing, etc. In some embodiments, the central module 404 of the information system 100 can analyze the images received from the various imaging modules 416-424 to determine traffic markings such as traffic lanes.

In step 410 of the method 400, the information system 100 determines a relative position of the vehicle 402 within the lanes 406-408, which can then be compared to another relative position of the vehicle 402 after a lapse of a given time period to determine lane drifting, lane changing, etc. In some embodiments, the central module 404 can analyze the images from the road facing camera within its integrated imaging module 416 to determine an edge of the vehicle 402 (e.g., the edge of the vehicle's hood). The central module 404 can utilize the identified edge to determine the distance between one of the lanes 406, 408 on either side of the vehicle 402, where the determined distance D #1 412 is the relative position of the vehicle 402 within the lanes 406-408.

In some embodiments, the central module 404 can further determine the curvature of the lanes to determine possible error in the measurement of the relative position of the vehicle 402 with the changing curvature of the lanes. In some embodiments, the central module 404 can determine the curvature of the lanes by identifying each lane marking separately and measuring the relative orientation of each adjacent lane marking to its adjacent lane marking. The overall change in orientation from one lane marking to another can be computed as a function of the measured relative orientation of a given adjacent lane marking to its adjacent lane marking. In some embodiments, the central module 404 can make appropriate compensation to the measured relative position of the vehicle 402 as a function of the curvature of the lanes. In some embodiments, the central module 404 can limit the relative position measurement to only lanes with a predefined maximum curvature.

In step 415 of the method 400, the information system 100 determines a second relative position of the vehicle 402 within the lanes 406-408 after the lapse of the given time period since the determination of the prior relative position of the vehicle 402 within the lanes 406-408. The second relative position can then be compared to the previously captured relative position of the vehicle 402 to determine lane drifting, lane changing, etc. Similar to step 410, the central module 404 analyzes the images from the road facing camera within its integrated imaging module 416 to determine the distance between the same edge and the same lane 406, 408 utilized in step 410. The determined distance D #2 414 is the second relative position of the vehicle 402 within the lanes 406-408 after the lapse of the given time period. Here, the given time period $t_{window}$ can a predetermined value that is set such that a change in vehicle 402 position over a certain threshold would constitute a lane drifting. In some embodiments, the given time period $t_{window}$ can be further determined as a function of the road conditions, such as curvature, weather, etc.

In step 420, the information system 100 determines the relative change in position of the vehicle 402 over the given time period $t_{window}$. In some embodiments, the central module 404 determines the relative change in position of the vehicle 402 as the difference between the first position D #1 412 and the second position D #2 414. FIG. 4C provides an illustrative example of the changing relative position of the vehicle 402 as measured from the lane 408 to the right of the vehicle 402. Here, $t_{window}$ is the time that had lapsed between measurements D #1 412 and D #2 414.

In step 425, the information system 100 determines whether the relative change in position of the vehicle 402 over the given time period $t_{window}$ is greater than a certain threshold, where the threshold can help distinguish a lane drift from a lane change. In one embodiment, the threshold can be the minimum allowed space between two lanes. In another embodiment, the threshold can be set as a function of the first relative position of the vehicle 402 (i.e. D #1 412) and the width of the lane, where a positive relative change in position over the width of the lane or a negative change in position over the first relative position of the vehicle 402 can signify a lane change.

When the change in relative position of vehicle 402 is less than the threshold, in step 430, the information system 100 determines whether the vehicle is lane drifting and any appropriate warning needs to be provided to the driver. In some embodiments, the central module 404 compares the relative change in position of the vehicle 402 against an allowed drift threshold (i.e. change in position over a given time period), beyond which the driver is provided a warning of the possible lane drifting through a warning message in the display module 118.

When the change in relative position of vehicle 402 is greater than the threshold, in step 435, the information system 100 determines a lane change and further determines whether the lane change was unintentional and any appropriate warning needs to be provided to the driver. In some embodiments, the central module 404 determines whether a lane change was intentional or unintentional based on the driver's use of the lane change indicator.

In some embodiments, the information system 100 includes a sensor attached to the lane change indicator (e.g., an accelerometer to the signal shaft of the vehicle), which signals the information system 100 every time the lane change indicator is utilized. If the lane change coincides with the use of the lane change indicator, the central module 404 determines the lane change was intentional. Otherwise, the central module 404 determines an unintentional or potentially unsafe lane change. In step 440, if the lane change was unintentional, the central module 404 of the information system 100 provides the driver with a warning message of the possible lane change through the display module 118.

Figure 5A:
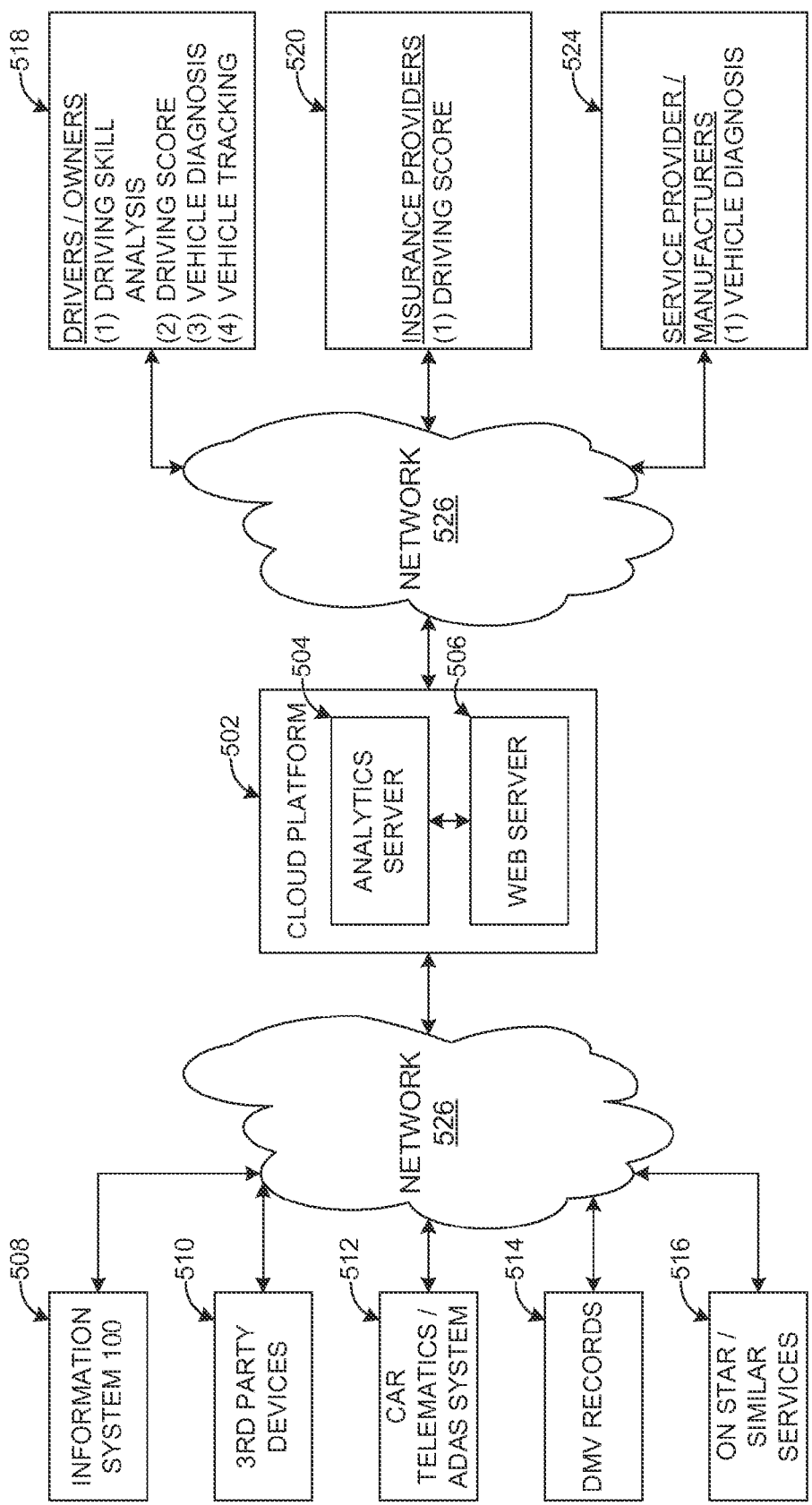
FIG. 5A describes the various driver and vehicle related analytics that are performed by a remote platform (e.g., a cloud based service) on the various information gathered from a plurality of sources.
Figure 5B:
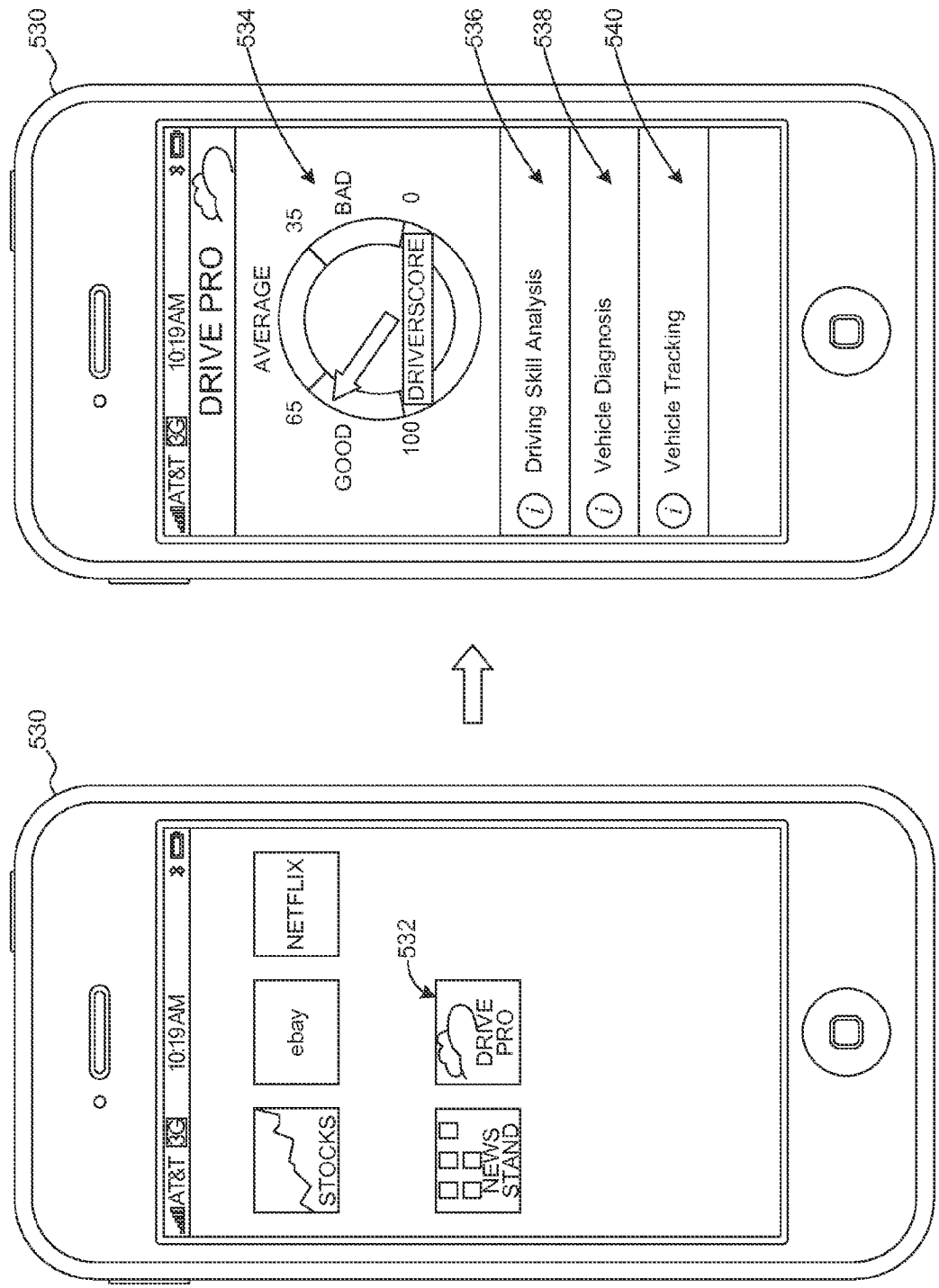

FIG. 5, which includes FIGS. 5A-5C, describes the various driver and vehicle related analytics that are performed by the information system 100 and by a remote platform (e.g., a cloud based service) on the various driver and vehicle related information stored in the information system 100. Such analytics could provide the driver (or any interested party, possibly, authorized by the driver) with insight into the driver's driving practices and any preventive maintenance that might be necessary for the vehicle.

As discussed earlier, in some embodiments, the central module 102 of the information system 100 stores the various warnings and gathered vehicle data (including the various images captured by the imaging modules 160) in a storage module 120. In one instance, the stored data can be used to perform various driver and vehicle related analytics. In some embodiments, the central module 102 performs the various driver and vehicle related analytics and provides the results to the driver. The results could either be displayed to the driver through the display module 118 or be transmitted to any devices (e.g., a smart phone or any computing device) associated with the driver through the network (e.g., network 526 in FIG. 5A). For example, an App in a smart phone associated with the driver may be configured to receive the results from the central module 102 through the network. The driver can then retrieve the results through their smart phone even when the central module 102 is physically inaccessible to the driver.

In some embodiments, the central module 102 transmits the gathered data to any requesting service and allows the requesting service to perform the various driver and vehicle related analytics and provide the results to the driver. In one instance, the requesting service could be a cloud-based service with an associated App installed on a computing device (e.g., the driver's smart phone) of the driver. The cloud-based service can perform the analytics and provides the results to the App, which can then be retrieved by the driver through the computing device.

FIG. 5A and the following discussion provide a brief, general description of a remote platform (i.e. a cloud-based service), also referred to as a cloud platform, which can be utilized to perform the driver and vehicle related analytics.

As shown in FIG. 5A, a variety of systems and devices can interact with the cloud platform 502 through the network 526 to provide data related to a driver's driving performance and vehicle condition. Further, a variety of systems and devices can interact with the cloud platform 502 to retrieve results of the various driver and vehicle related analytics performed by the cloud platform 502 using the received data. As discussed above, in some embodiments, the information system 508 utilizes a communication module 116 to interact with the cloud platform 502 via the network 526. Similarly, the other systems and devices, such as the third party devices 510, car telematics 512 (also referred to as the Advanced Driver Assistance System (ADAS)), DMV records database systems 514, remote driver assistance services 516 (e.g., OnStar), etc., can communicate with the cloud platform 502 via the network 526 using a communication module equivalent (in functions) to the communication module 116 of the information system 508.

In one example, the information system 508 utilizes the communication module 116 to connect to the network 526 using one or more cellular transceivers or base station antennas (in cellular implementations), access points, terminal adapters, routers or modems (in IP-based telecommunications implementations), or combinations of the foregoing (in converged network embodiments). In the context of this description, information communicated may include, for example, data related to a driver's driving performance and vehicle condition.

In some instances, the network 526 is the Internet, allowing a driver's computing device 518 (with, for example, WiFi capability), an authorized insurance provider's computer system 520, or an authorized vehicle service provider's (or manufacturer of said vehicle) computer system 524 to access analytics results available via various servers (e.g., web server 506) of the cloud platform 502 connected via the network 526. In some instances, the driver's computing device 518 is a phone and the phone is used to access web content through the network 526 (e.g., when a 3G or an LTE service of the phone is used to connect to the network 526). Here, the network 526 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

As discussed above, in some instances, a driver uses one of the computing devices (e.g., a phone, a personal computer, etc.) to connect to the cloud platform 502 through the network 526. In one embodiment, the cloud platform 502 comprises an analytics server 504 coupled to a local database (not shown in FIG. 5A). The term "analytics server" as indicated herein, refers to an individual or multiple server stations or other computing apparatus. In one embodiment, the analytics server 504 is a web server capable of hosting a website and generating and storing content (e.g., various webpages) that is associated with the website. In some embodiments, the analytics server 504 is separate from a web server 506, but communicates with a web server 506 to generate, provide, manage, and/or control content (e.g., driver and vehicle related analytics) provided by the web server 506.

In general, the analytics server 504 includes various modules (either implemented as software or in hardware) that allow for driver and vehicle information to be collected from various systems and devices 508-516, and to coordinate and provide the results from the various analytics performed, by the analytics server 504, on the received data to end systems 518-524. Some of the analytics performed by the analytics server 504 can include driving skill analysis, a driving score determination (which quantifies a risk associated with the operation of the vehicle by the driver using various driving skill related parameters), vehicle diagnostics, etc. In embodiments, the analytics server 504 may independently coordinate the processing and eventual servicing of end system 518-524 requests for results from the various analytics. As will also be explained in further detail herein, the cloud platform 502, which includes the analytics server 504 and the web server 506, incorporates one or more functional units to achieve each of the above discussed functionalities.

As discussed earlier, the cloud platform 502 receives driver and vehicle related information from various systems and devices 508-516. Some of the systems and devices 508-516 can include the information system 508, third party devices 510, car telematics 512 (also referred to as the Advanced Driver Assistance System (ADAS)), DMV records database systems 514, remote driver assistance services 516 (e.g., OnStar), etc. In some embodiments, the cloud platform 502 creates and associates a driver profile for each driver, where the driver profile is used to store the various driver and vehicle related information received from the various systems and devices 508-516.

In some embodiments, the cloud platform 502 utilizes the received image associated with a driver profile in the information system 100 to create and associate the driver related information from the various systems and devices 508-516 to the appropriate driver profile. The cloud platform 502 can perform facial recognition using the received image and the driver image (if available) from each of the various systems and devices 508-516. For example, a driver's DMV records can possibly be identified by performing facial recognition (in addition to other forms of identification) against the picture of the driver in her driver's license (stored in DMV records). In another embodiment, the cloud platform 502 can utilize a driver name and other identification information (provided earlier by the driver or other sources) to create, match and associate a driver profile with the information from the various systems and devices 508-516.

In some embodiments, the cloud platform 502 creates and associates information received from information system 508 with appropriate driver profiles corresponding to the various driver profiles created and maintained by the information system 508 (as discussed earlier). In some embodiments, the cloud platform 502 receives a variety of information gathered by the information system 508 using the various methods discussed in FIGS. 2-4. Some of the information includes the various data gathered by the information system 508 when analyzing the appropriateness of each of the warnings discussed earlier. For example, the information system 508 provides the cloud platform 502 with information relating to the safe distance warning analysis (refer to FIG. 3A for more detail) performed by the information system 508. The information provided by the information system 508 can include the speed of the vehicle before and after a safe distance warning analysis was performed.

Further, the provided information can include the distance between the vehicle and an object (e.g., another vehicle, a pedestrian, a biker, a motorcycle) in proximity of vehicle when safe distance warning analysis was performed, where the distance is provided either in units of length or in units of time (i.e. the possible time to collision between the vehicle and the object). Additional information can include the images of the object received from the imaging modules 160, the driver's reaction time after a safe distance warning was provided and before a safe distance warning was provided (resulting in avoidance of the warning), etc.

In some embodiments, the cloud platform 502 can utilize the information related to the safe distance warning analysis to determine how aggressive or safe a given driver is. For example, if a driver is consistently being provided safe distance warnings and the time to collision indicates imminent collision before the driver reacts to the warnings, then the cloud platform 502 will consider the driver an aggressive driver.

Further, the cloud platform 502 can provide information regarding the driver, such as driving performance, a driving score, driving skills, etc., which reflects the determined aggressiveness of the driver. One implementation of how a driving score for the driver can be computed using the information related to the safe distance warning analysis and other information received from the information system 100 is discussed in detail with reference to FIG. 6. Additional details regarding the various information provided by the information system 100 to the cloud platform 502 are discussed with reference to FIG. 6.

As discussed earlier, the cloud platform 502 receives further driver and vehicle related information from various systems and devices 508-516. In addition to the information system 508, some of the systems and devices 510-516 can include, third party devices 510, car telematics 512 (also referred to as the Advanced Driver Assistance System (ADAS)), DMV records database systems 514, remote driver assistance services 516 (e.g., OnStar), etc.

In one instance, the third party devices 510 can include devices embodying one or more functions of the information system 100 and provide the cloud platform 502 with a variety of information gathered by the third party devices 510 performing one or more of the functions the devices 510 are designed for. Some of the information includes the various data gathered by the devices 510 when analyzing the appropriateness of one or more of the warnings discussed earlier.

In some instances, the car telematics or ADAS 512 that provides the cloud platform 502 with a variety of information can include systems such vehicle-integrated navigation system, adaptive cruise control system, night vision system, automatic parking system, lane change assistance system, hill descent control system, etc. The information provided to the cloud platform 502 can include information gathered by the systems 512 when performing one or more of the functions the systems 512 are designed for. For example, the lane change assistance system can provide information such as how many times the driver changed lanes within a given period, the speed at which the driver changed lanes, the proximity of any objects when the driver changed lanes, etc. In some embodiments, the cloud platform 502 can utilize the information to determine how safely a given driver drives. As discussed earlier, the information can be used in determining a driving score for the driver.

In some embodiments, the cloud platform 502 can further receive driver and vehicle related information from DMV records database systems 514, where the received information can include any tickets or citations received by the driver, any accidents the driver was involved in, any accidents the vehicle of the driver was involved in, etc. In one instance, such information can be utilized by the cloud platform 502 when determining a driving score for the driver.

Further, in some embodiments, the cloud platform 502 can further receive driver and vehicle related information from remote driver assistance services 516 (e.g., OnStar), where the received information can include any information monitored by the remote driver assistance services 516, such as location of the vehicle, distance traveled, speed of vehicle, any emergencies the vehicle was involved in, etc. In one instance, such information can be utilized by the cloud platform 502 to determine any necessary vehicle maintenance. For example, an emergency call regarding an engine light can be used to plan appropriate services needed to address the cause of the engine light. An implementation of how the various analytics and the driving score computation is performed by the cloud platform 502 using the information received from the various systems and devices 508-516 is discussed in detail with reference to FIG. 6.

As discussed earlier, in some embodiments, the cloud platform 502 provides access to the results of the various analytics and the computed driving score to interested parties. The interested parties can include the driver of the vehicle, any authorized insurance provider for the driver (and her vehicle), any authorized vehicle service provider (or manufacturer of said vehicle), etc. In some embodiments, the cloud platform 502 can provide different levels of access to each interested party, where drivers are able to access all the information while insurance providers are restricted to just receiving the driving score of the driver and the service providers are restricted to just the vehicle diagnostics information.

For example, an insurance provider is allowed to access/receive the driving score of the driver to utilize in their risk assessment performed when insuring the driver and/or the vehicle. As discussed earlier, the driving score quantifies a risk associated with a driver's operation of a vehicle based on analysis of various driving skill related parameters. The insurance provider can utilize the driving score and set the insurance premium, terms and conditions of the insurance coverage, etc. based on the driving score (e.g., the higher the driving score (indicating a better driver), the lower the insurance premium).

In some embodiments, the information provided by the cloud platform 502 to the driver includes a driving skill analysis of the driver, a driving score quantifying the driving skill of the driver (in other words, quantifying the risk involved when the driver operates the vehicle), vehicle diagnostics information, any vehicle tracking related information (such as last known location visited), etc. As discussed earlier, in some embodiments, the cloud platform 502 allows a driver to access the information using a computing device 518. In one instance, the driver's computing device 518 is a smart phone and the smart phone is used to access the information through the network 526.

FIG. 5B provides an illustration of how a smart phone can be utilized to retrieve and view the various information provided by the cloud platform 502 to the driver. As discussed earlier, the cloud platform 502 can have an associated App 532, which when installed on the driver's smart phone 530, allows the driver to access the results related to the driver on the cloud platform 502 through the App 532. In some embodiments, the cloud platform 502 can identify the information associated with the driver by matching a stored driver profile with any identifying information available on the smart phone 530 which can be provided by the App 532 to the cloud platform 502. In another embodiment, the cloud platform 502 can require the driver to register with the cloud platform 502 using the App 532 and provide identifying information which can be used by cloud platform 502 to identify an associated driver profile for the driver.

In some embodiments, once a driver profile is associated with an App 532, the cloud platform 502 allows the driver to access the information available on the cloud platform 502 by clicking on an icon of the App 532 on the smart phone 530

(without having to repeatedly provide any identifying information). The App 532 can display the information retrieved from the cloud platform 502 according to their respective categories 534-540. The App 532 provides the driver score as a gauge with ranges of the score marked as "bad", "average" and "good".

The App 532 further provides a section with the results of the driving skill analysis 536, a section with vehicle diagnostics information 538, and a section with vehicle tracking information 540. In one embodiment, each section 536-540 of the App 532, when clicked, provides a detailed breakdown of the various information associated with the clicked section 536-540 (e.g., FIG. 5C), similar to the displayed driver score 534 information. In FIG. 5C, the driving skill analysis 536 associated information 544 is displayed in the App 532 while the driver score is provided as section 542 that can be clicked to retrieve the associated detailed information 534.

FIG. 5C provides an illustration of how a smart phone can be utilized to retrieve and view the driving skill analysis provided by the cloud platform 502 to the driver. As discussed earlier, the cloud platform 502 can identify the driving skill analysis prepared for the driver by matching a stored driver profile with any identifying information available on the smart phone 530 which can be provided by the App 532 to the cloud platform 502. In one embodiment, the App 532 provides the driving skill analysis as a bar graph 544 with each bar representing a driving skill related parameter such as acceleration tendency, braking tendency, lane changing skill, tendency to follow at safe distance, etc.

Some of the other driving skill related parameters are discussed in detail with respect to a driving score computation in FIG. 6. In one embodiment, each bar associated with a parameter in the bar graph represents a relative value of the parameter (with reference to a predetermined threshold value of the parameter) computed using an associated function (1)-(8) as discussed in detail below. Further, it should be noted that the driving skill analysis can be presented using any well-known representations that convey the computed value of each parameter associated with the driving skill analysis and the value of the each parameter can be conveyed as both absolute and relative values (as discussed above).

FIG. 6 provides an illustrative example of a function that can be used to quantify the various driver and vehicle related information received by the cloud platform 502 from the various systems and devices 508-516 and compute the driving score for the driver.

In one embodiment, the cloud platform 502 utilizes the function (1) (also shown in FIG. 6) to determine a driving score (DS) for the driver, where the function takes the quantified values of the various driver and vehicle related information to determine the DS.

$$DS=f\{N(A+B+C+D+E+L+S)(T),(VE),(W),(R),(n)\} \quad (1)$$

where, N is the number of times each of the quantified parameters were above safe levels, T is the duration for which each of the quantified parameters were above safe level (with T=0 if the duration was small, reflecting driver alertness about driving), D measures how well a driver practices keeping safe distances from other objects that share the road, L measures a driver's tendency for lane drifting, C measures how well a driver performs lane changing, B measures how well a driver practices braking, A measures a driver's tendency for acceleration, S measures a driver's tendency for exceeding posted speed limits, E measures a driver's tendency for taking eyes off the road, W measures Weather elements affecting driving, n is the Age of driver, R is the Driving Records (R) such as Violations/Tickets, accidents, VE is the gathered vehicle environment information ("VE") used to determine whether a driver's actions (e.g., any of the monitored tendencies utilized in the DS computation, such as acceleration, lane drifting, etc.) are safe even when the driver exceeds preset safe levels for any of the monitored actions, etc.

In one instance, the parameter W in function (1) is utilized to adjust what is considered a safe limit (e.g., speed of vehicle operation) for various driving parameters (e.g., speed, safe distance of following, etc.) based on the weather condition the vehicle is operated in. Similarly, parameters "n" and "R" in function (1) can be used to give an appropriate scaling to the DS based on the assessed risk of accidents for the particular demography with similar age "n" and driving record "R" parameters.

The following discussion describes some of the other parameters utilized in the DS function (1) and how each parameter affects the DS computed by the DS function (1).

Acceleration Tendency (Parameter "A")

In one embodiment, the cloud platform 502 periodically measures a driver's acceleration tendency as parameter "A". In one embodiment, parameter "A" captures an acceleration tendency value of a driver (during a given time period) based on whether the driver constantly accelerates over short distances before decelerating instead of driving at a more steady pace over the short distance (resulting in the driver being considered unsafe). Here, when the determined acceleration tendency value of parameter "A" is higher than a predetermined acceleration threshold value, the driver's driving during that period of time is deemed unsafe and the DS adjusted accordingly. In some embodiments, parameter "A" can be measured using function (2) as shown below.

$$A=f\{\text{freq of Acceleration,freq of Deceleration,distance traveled between acceleration \& deceleration,traffic condition,location of vehicle}\} \quad (2)$$

In function (2), the cloud platform 502 determines parameter "A" as a function of the frequency of acceleration over a given period, frequency of deceleration over the same given period, distance traveled between each acceleration event and a following deceleration event (i.e. braking) during the same given period, the traffic condition during the given period and the location of the vehicle. In one embodiment, the cloud platform 502 determines the acceleration and deceleration of the vehicle in the given period based on the gathered speed of the vehicle (over the given period) from the information system 100 (which in turn could have gathered the information from the on-board module 104).

In some embodiments, the cloud platform 502 utilizes the insight gained during the computation of parameter "A" to determine other driver and vehicle related analytics such as possible driving tips to provide driver, possible vehicle parts that are subject to excessive wear-and-tear due to excessive acceleration and deceleration, which need to be inspected during next vehicle service, etc.

Braking Tendency (Parameter "B")

In some embodiments, the cloud platform 502 periodically measures a driver's braking tendency as parameter "B" (similar to parameter "A"). In one embodiment, parameter "B" captures a braking tendency value of a driver (during a given time period) based on whether the driver constantly brakes hard (i.e. decelerates hard) instead of slowing down over some distance using soft braking. Here, when the determined braking tendency value of parameter "B" is higher than a predetermined braking threshold value, the driver's driving during that period of time is deemed unsafe and the DS adjusted accordingly. In some embodiments, parameter "B" can be measured using function (3) as shown below.

$$A = f\{\text{freq of braking, freq of emergency braking, type of braking technique}\} \quad (3)$$

In function (3), the cloud platform 502 determines B as a function of the frequency of braking over a given period, frequency of emergency braking over the same given period and type of braking technique used. In one embodiment, the cloud platform 502 determines braking and whether the braking is an emergency braking based on the gathered speed of the vehicle over the given period and whether the speed of vehicle slowed abruptly (indicating an emergency braking event). Further, each braking event can be classified into one or more types of braking (based on degree of change in speed of vehicle) such as soft braking, normal braking, hard braking, emergency braking, etc.

In some embodiments, the cloud platform 502 utilizes the insight gained during the computation of parameter "B" to determine other driver and vehicle related analytics such as possible driving tips to provide driver, possible vehicle parts that are subject to excessive wear-and-tear due to excessive braking, which need to be inspected during next vehicle service, etc.

Lane Changing Performance (Parameter "C")

In some embodiments, the cloud platform 502 periodically measures how well a driver changing lane as parameter "C". In one embodiment, parameter "C" captures a lane changing skill value of a driver (during a given time period) based on whether the driver constantly changes lanes instead of staying in a given lane for a reasonable period of time, whether the driver utilizes the indicator when changing lanes, whether the driver gives enough space between vehicles when changing lanes, etc. Here, when the determined lane changing skill value of parameter "C" is higher than a predetermined lane changing threshold value, the driver's driving during that period of time is deemed unsafe and DS adjusted accordingly. In some embodiments, parameter "C" can be measured using function (4) as shown below.

$$C = f\{\text{freq of lane change, unwarned lane change, unsafe distance lane change}\} \quad (4)$$

In function (4), the cloud platform 502 determines parameter "C" as a function of the frequency of lane changes over a given period, number of unwarned lane changes in the given period of time and number of unsafe lane changes during the given time period braking over the same given period. Here, a lane change is considered unwarned if the driver did not utilize the indicator when changing lanes. Further, a lane change is performed in unsafe distance if a driver does not given enough space between vehicles in the proximity when changing lanes.

In one embodiment, the cloud platform 502 determines lane changing and whether the lane changing was safe and warned based on the gathered information from the information system 100 during the lane change warning analysis (as discussed earlier with reference to FIG. 4A-4C). In some embodiments, the cloud platform 502 utilizes the insight gained during the computation of parameter "C" to determine other driver and vehicle related analytics such as possible driving tips to provide driver, etc.

Safe Distance Following Performance (Parameter "D")

In some embodiments, the cloud platform 502 periodically measures whether a driver is giving enough separation between the driver's vehicle and other objects in the proximity of the driver's vehicle as parameter "D". In one embodiment, parameter "D" captures a driving distance value (as a time to collision with an object in proximity of vehicle) during a given time period as a function of the speed of vehicle and distance of the vehicle from one or more objects in proximity of vehicle. In one embodiment, the cloud platform 502 utilizes the object directly in path of the vehicle when determining parameter "D".

Here, when the determined driving distance value of parameter "D" is higher than a predetermined driving distance threshold value, the driver is following vehicles at unsafe distances during that period of time and DS adjusted lower to reflect the unsafe driving. In some embodiments, parameter "D" can be measured using function (5) as shown below.

$$D = \text{func}\{(tcv, tcp, tcm, tco), (tra, trb)\} \quad (5)$$

where, tcv is measured as the time to collision with vehicles in proximity of vehicle, tcp is measured as the time to collision with pedestrians and bikers in proximity of vehicle, tcm is measured as the time to collision with motorcycles in proximity of vehicle, tco is measured as the time to collision with objects in proximity of vehicle, tra is measured as the driver reaction time after a unsafe distance warning (as discussed earlier) is given, and trb is measured as the driver's reaction time before a unsafe distance warning is issued (thus avoiding the potential warning). Here, the time to collision is measured with respect to different objects to capture the different levels of risks involved in following the different objects at an unsafe distance.

In one embodiment, the cloud platform 502 determines driving distance value based on the gathered information from the information system 100 during the safe distance warning analysis (as discussed earlier with reference to FIG. 3A-3D). In some embodiments, the cloud platform 502 utilizes the insight gained during the computation of parameter "D" to determine other driver and vehicle related analytics such as possible driving tips to provide driver, etc.

Focus of Eyes on Road (Parameter "E")

In some embodiments, the cloud platform 502 periodically measures a driver's focus on the road as parameter "E". In one embodiment, parameter "E" captures an eyes on road value of a driver (during a given time period) based on the duration driver's gaze was not focused towards the road while driving and the speed and traffic of vehicle when driver's gaze was not focused towards the road. Here, when the eyes on road value of parameter "E" is higher than an eyes on road threshold value, the driver's driving during that period of time is deemed unsafe and DS adjusted accordingly. In some embodiments, parameter "E" can be measured using function (6) as shown below.

$$E = f\{(\text{total driving time} - \text{total time eye were on road}), \text{speed of vehicle, traffic Condition}\} \quad (6)$$

In function (6), the cloud platform 502 determines parameter "E" as a function of the total driving time the eyes of the driver were off the road during a given period of time, the speed of the vehicle (e.g., average speed) when the driver's eyes were off the road and the traffic condition during the same time period. Here, parameter "E" captures the how unsafe the driver was driving based on the speed, traffic and duration the driver's gaze not focused towards the road while driving. In one embodiment, the cloud platform 502 determines eyes on road value based on the information gathered by the information system 100 during the driver distraction warning analysis (as discussed earlier with reference to FIG. 1). In some embodiments, the cloud platform 502 utilizes the insight gained during the computation of parameter "E" to determine other driver and vehicle related analytics such as possible driving tips to provide driver, etc.

Lane Drifting Tendency (Parameter "L")

In some embodiments, the cloud platform 502 periodically measures a driver's lane drifting tendency as parameter "L", where a vehicle is considered to be lane drifting when the vehicle beings to drift over the lanes or in between the lanes. In one embodiment, parameter "L" captures a lane drifting tendency value of a driver (during a given time period) based on the frequency of lane drifting events within the given time period and the pattern of each lane drifting event (e.g., erratic or periodic drifting). Here, when the determined lane drifting tendency value of parameter "L" is higher than a predetermined lane drifting tendency threshold value, the driver's driving during that period of time is deemed unsafe and DS adjusted accordingly. In some embodiments, parameter "L" can be measured using function (7) as shown below.

$$L = f\{\text{freq of lane drifting, pattern of lane drifting}\} \quad (7)$$

In function (7), the cloud platform 502 determines parameter "L" as a function of the frequency of lane drifting over a given period and the pattern of lane drifting within the given period. Here, the pattern of lane drifting can be utilized to determine if the drifting is possibly due to vehicle mechanical issues or simply due to driver-related issues (e.g., driver being drowsy). For example, a periodic or a cyclic drifting of the vehicle from one direction to another indicates a potential wheel alignment issue with the vehicle while an erratic drifting of the vehicle indicates potential driver related issues such as a drunk or drowsy driver. The DS can be adjusted lower when the excessive lane drifting is due to driver related issues and simply report non-driver related issues (such as vehicle wheel alignment caused drifting) in the vehicle maintenance report.

In one embodiment, the cloud platform 502 determines lane drifting and the lane drifting pattern based on the information gathered by the information system 100 when performing the lane drifting warning analysis (as discussed earlier with reference to FIG. 4A-4C). In some embodiments, the cloud platform 502 utilizes the insight gained during the computation of parameter "L" to determine other driver and vehicle related analytics such as possible driving tips to provide driver, vehicle diagnostics information, etc.

Speeding Tendency (Parameter "S")

In some embodiments, the cloud platform 502 periodically measures a driver's speeding tendency as parameter "S". When the determined speeding tendency value of parameter "S" is higher than a predetermined speeding tendency threshold value, the driver's driving during that period of time is deemed unsafe and DS adjusted accordingly. In some embodiments, parameter "S" can be measured using function (8) as shown below.

$$S = f\{\text{freq of speed limit violation, duration of violation,} \\ \text{distance traveled at higher than rated speed,} \\ \text{traffic, location and weather}\} \quad (8)$$

In function (8), the cloud platform 502 determines parameter "S" as a function of the frequency of speed limit violations over a given period, duration of violation (e.g., an average of each violation duration), distance traveled in violation of speed limit (e.g., an average of distance traveled at each violation), traffic, location and the weather within the given period. Parameters like traffic, location (e.g., hilly terrain), and weather can be used to evaluate the degree of dangerousness of each speeding violation. For example, speeding in heavy traffic can increase the risk of accident. So, the DS is adjusted lower to reflect the unsafe driving practice. Similarly, parameters such as frequency of violations and the degree of violation (based on distance and duration traveled at excessive speeds) can be used to glean the driver's disregard for speed limits and the increased risk of accidents. The DS can be adjusted lower when excessive speeding tendency is detected.

In one embodiment, the cloud platform 502 determines speeding tendency based on the information gathered by the information system 100 when performing the speeding warning analysis (as discussed earlier with reference to FIG. 3A-3D). In some embodiments, the cloud platform 502 utilizes the insight gained during the computation of parameter "S" to determine other driver and vehicle related analytics such as possible driving tips to provide driver (e.g., to slow down), etc.

Vehicle Environment (Parameter "VE")

In one embodiment, the cloud platform 502 periodically monitors the vehicle's environment (e.g., traffic conditions around the vehicle, etc.) and utilizes the gathered vehicle environment information ("VE") to determine whether a driver's actions (e.g., any of the monitored tendencies utilized in the DS computation, such as acceleration, lane drifting, etc.) are safe even when the driver exceeds preset safe levels for any of the monitored actions. But utilizing VE, the cloud platform 502 can assess whether a driver's actions were in response to the vehicle's operating environment and not the result of any driver's unsafe driving tendencies.

In one instance, the gathered information can include the traffic conditions around the vehicle, speed of other vehicles in proximity, actions by vehicles in proximity, etc. Each specific information can be utilized to determine a new safe limit for a given driver action and the driver's (unsafe) tendencies can be determined based on the new safe limit that accounts for the driver's actions in the given vehicle's environment. For example, if the traffic around the vehicle is flowing at a speed higher than the allowed speed limit on the road, the driver of the vehicle will have to drive at the speed closer to the speed of the traffic to be safety operating the vehicle in the traffic. So, in this instance, the cloud platform 502 will utilize the speed of the traffic when determining whether the driver is speeding.

Similarly, in the above example, the safe speed limit on a given road can be lowered than that posted on the given road. For example, if the weather conditions (such as heavy rain, etc.) force the traffic to drive at a slower speed than the allowed speed limit on the road, then the cloud platform 502 will utilize the lower speed (of the traffic) when determining whether the driver is speeding.

Further, the VE can also be utilized to determine other driving tendencies such as lane changing, etc. by monitoring the vehicles in the proximity of the vehicle. For example, in the event of a road hazard that forces every vehicle on a given lane to change lanes abruptly, the cloud platform 502 would have determined that the driver is performing an unsafe lane change without the VE information. On the other hand, by utilizing the VE information, the cloud platform 502 can assess the similarly of driver's actions to other drivers in the proximity and determine that the driver's unsafe actions were likely the result of external conditions when the driver's actions are correlated with actions of other drivers.

In one embodiment, the cloud platform 502 determines VE from the information gathered by the information system 100, 508 such as the images of the vehicle proximity (e.g., used to assess actions of other vehicles in the proximity), the objects in the vehicle proximity, speed of other vehicles in vehicle proximity, etc. In some embodiments, the cloud platform 502 further utilizes the information gathered from other third-party devices and software 510 (e.g., data shared through Waze App), information systems 100 installed on other vehicles, etc. to determine the actions of other vehicles in the proximity. For example, if another vehicle with the information system 100 indicates a similar driver behavior around the same location as that of the driver of the vehicle monitored, the cloud platform 502 can then determine the driver's unsafe actions were likely the result of external conditions.

FIG. 7 is a block diagram of an apparatus that may perform various operations, and store various information generated and/or used by such operations, according to an embodiment of the disclosed technique. The apparatus can represent any computer or processing system described herein. The processing system 700 is a hardware device on which any of the entities, components or services depicted in the examples of FIGS. 1-6 (and any other components described in this specification) can be implemented, such as query prediction unit, storage unit, stats depot etc. The processing system 700 includes one or more processors 705 and memory 710 coupled to an interconnect 715. The interconnect 715 is shown in FIG. 7 as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 705 is/are the central processing unit (CPU) of the processing system 700 and, thus, control the overall operation of the processing system 700. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 710 is or includes the main memory of the processing system 700. The memory 710 represents any form of random access memory (RAM), read-only memory (ROM), flash memory, or the like, or a combination of such devices. In use, the memory 710 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 705 through the interconnect 715 are a network adapter 730, a storage device(s) 720 and I/O device(s) 725. The network adapter 730 provides the processing system 700 with the ability to communicate with remote devices, over a network and may be, for example, an Ethernet adapter or Fibre Channel adapter. The network adapter 730 may also provide the processing system 700 with the ability to communicate with other computers within the cluster. In some embodiments, the processing system 700 may use more than one network adapter to deal with the communications within and outside of the cluster separately.

The I/O device(s) 725 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 710 can be implemented as software and/or firmware to program the processor(s) 705 to carry out actions described above. In certain embodiments, such software or firmware may be initially provided to the processing system 700 by downloading it from a remote system through the processing system 700 (e.g., via network adapter 730).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 720 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A driver assistance system to assist a driver of a vehicle, the system comprising: a speed detection system communicating with a first controller of the vehicle to determine a speed of the vehicle, wherein the first controller monitors and gathers data indicative of the speed of the vehicle; a sensing system having at least one first sensor affixed to the vehicle to monitor and gather a first information associated with a monitoring zone defined along a region proximate to the vehicle, the sensing system further including a first transmitter for transmitting the first information periodically; a display module located within the interior of the vehicle; a second controller in communication with the speed detection system, the sensing system and the display module; wherein upon receiving the first information from the sensing system, the second controller utilizes the first information to detect the presence and the proximity of an object in the monitored zone of the vehicle, wherein upon detection of said object in the monitored zone of the vehicle, the second controller determines the appropriateness of providing a warning to a driver of the vehicle regarding said object, the appropriateness of providing the warning to the driver regarding said object determined as a function of the proximity of said object to the vehicle and the speed of the vehicle; and wherein upon a determination that the warning is appropriate, the second controller displays the warning, through the display module, to the driver of the vehicle regarding the presence and the proximity of said object, wherein: the second controller utilizes the first information to determine a first and a second location of the vehicle on a road way the vehicle is presently operated in, wherein a given location of the vehicle on the road way is determined as a relative location of the vehicle with respect to a given lane on the road way, the second controller utilizing the determined first and second location of the vehicle to detect an occurrence of a lane change by the vehicle, wherein upon detection of the occurrence of the lane change by the vehicle, the second controller determining the appropriateness of providing an unsafe lane change warning to the driver of the vehicle, the appropriateness of providing the unsafe lane change warning determined as a function of the proximity of any object in the monitored zone of the vehicle and a usage of a lane change indicator by the driver when the vehicle lane change occurred; and wherein upon a determination that the speeding warning is appropriate, the second controller displays the speeding warning, through the display module, to the driver of the vehicle, further comprising: a driver action monitoring system having at least one second sensor affixed to the vehicle to monitor and gather second information associated with one or more actions of the driver during the operation of the vehicle, the driver action monitoring system further including a second transmitter for transmitting the gather information periodically; wherein upon receiving the second information from the driver action monitoring system, the second controller utilizes the second information to determine an extent of focus of the driver on the road way during operation of the vehicle, wherein the second controller utilizes the extent of focus of the driver to determine the appropriateness of providing a distracted driving warning to the driver of the vehicle; and wherein upon a determination that the distracted driving warning is appropriate, the second controller displays the warning, through the display module, to the driver of the vehicle.

2. The object detection and warning system according to claim 1, wherein: the second controller utilizes the first information to determine the speed of the vehicle and a speed limit of a road way the vehicle is presently operated in, wherein upon the determined speed of the vehicle being greater than the determined speed limit of the road way, the second controller determines the appropriateness of providing a speeding warning to the driver of the vehicle; and wherein upon a determination that the speeding warning is appropriate, the second controller displays the speeding warning, through the display module, to the driver of the vehicle.

3. The object detection and warning system according to claim 1, wherein the first controller is an on-board vehicle diagnostics system.

4. The object detection and warning system according to claim 1, wherein the first and second sensor is an imaging module.

5. The object detection and warning system according to claim 4, wherein the gathered information includes a visual information gathered by the imaging module.

6. The object detection and warning system according to claim 1, wherein the object includes one or more of: a second vehicle; a biker; a pedestrian; or a motorcyclist.

7. The object detection and warning system according to claim 1, wherein the monitored driver action includes one or more of: an action of a hand of the driver; or a focus direction of eyes of the driver.

8. A method of providing driving assistance information to a driver using a driver assistance system comprising sensor units for collecting sensor data concerning the driver, a vehicle operated by the driver and a proximity of the vehicle, and a processing unit for processing the sensor data, the method comprising the steps of: acquiring driver information, vehicle information, vehicle proximity information; utilizing the acquired information to determine a presence and a position of an object within proximity of said vehicle; determining appropriateness of providing a warning to the driver regarding said object, the appropriateness of providing the warning determined as a function of the position of said object to the vehicle and a speed of the vehicle; and displaying the warning to the driver regarding the presence and the proximity of said object when providing the warning to the driver is determined to be appropriate, further comprising: utilizing the acquired information to determine a first and a second location of the vehicle on a road way the vehicle is presently operated in, wherein a given location of the vehicle on the road way is determined as a relative location of the vehicle with respect to a given lane on the road way: utilizing the determined first and second location of the vehicle to detect an occurrence of a lane change by the vehicle; when the occurrence of the lane change by the vehicle is detected, determining the appropriateness of providing an unsafe lane change warning to the driver of the vehicle, the appropriateness of providing the unsafe lane change warning determined as a function of the proximity of any object in the monitored zone of the vehicle and a usage of a lane change indicator by the driver when the vehicle lane change occurred; and displaying the unsafe lane change warning to the driver when providing the unsafe lane change warning to the driver is determined to be appropriate, further comprising: monitoring and gathering information associated with one or more actions of the driver during the operation of the vehicle; utilizing the gathered information to determine an extent of focus of the driver on a road way the vehicle is presently operated on; utilizing the extent of focus of the driver to determine the appropriateness of providing a distracted driving warning to the driver of the vehicle; and displaying the distracted driving warning to the driver when providing the distracted driving warning to the driver is determined to be appropriate.

9. The method of claim 8, further comprising: utilizing the acquired information to determine the speed of the vehicle and a speed limit of a road way the vehicle is presently operated in, when the determined speed of the vehicle is greater than the determined speed limit of the road way, determining appropriateness of providing a speeding warning to the driver of the vehicle; and displaying the speeding warning to the driver when providing the speeding warning to the driver is determined to be appropriate.

10. The method of claim 8, wherein the sensor units are imaging modules.

11. The method of claim 10, wherein the gathered information includes a visual information gathered by the imaging module.

12. The method of claim 8, wherein the object includes one or more of: a second vehicle; a biker; a pedestrian; or a motorcyclist.

13. The method of claim 8, wherein the monitored driver action includes one or more of: an action of a hand of the driver; or a focus direction of eyes of the driver.

14. A driver assistance system for providing driving assistance information to a driver of a vehicle, the system comprising: means for acquiring driver information, vehicle information, vehicle proximity information; means for utilizing the acquired information to determine a presence and a position of an object within proximity of said vehicle; means for determining appropriateness of providing a warning to the driver regarding said object, the appropriateness of providing the warning determined as a function of the position of said object to the vehicle and a speed of the vehicle; and means for displaying the warning to the driver regarding the presence and the proximity of said object when providing the warning to the driver is determined to be appropriate, further comprising: means for utilizing the acquired information to determine a first and a second location of the vehicle on a road way the vehicle is presently operated in, wherein a given location of the vehicle on the road way is determined as a relative location of the vehicle with respect to a given lane on the road way; means for utilizing the determined first and second location of the vehicle to detect an occurrence of a lane change by the vehicle; when the occurrence of the lane change by the vehicle is detected, means for determining the appropriateness of providing an unsafe lane change warning to the driver of the vehicle, the appropriateness of providing the unsafe lane change warning determined as a function of the proximity of any object in the monitored zone of the vehicle and a usage of a lane change indicator by the driver when the vehicle lane change occurred; and means for displaying the unsafe lane change warning to the driver when providing the unsafe lane change warning to the driver is determined to be appropriate, further comprising: means for monitoring and gathering information associated with one or more actions of the driver during the operation of the vehicle; means for utilizing the gathered information to determine an extent of focus of the driver on a road way the vehicle is presently operated on; means for utilizing the extent of focus of the driver to determine the appropriateness of providing a distracted driving warning to the driver of the vehicle; and means for displaying the distracted driving warning to the driver when providing the distracted driving warning to the driver is determined to be appropriate.

15. The system of claim 14, further comprising: means for utilizing the acquired information to determine the speed of the vehicle and a speed limit of a road way the vehicle is presently operated in, when the determined speed of the vehicle is greater than the determined speed limit of the road way, means for determining appropriateness of providing a speeding warning to the driver of the vehicle; and means for displaying the speeding warning to the driver when providing the speeding warning to the driver is determined to be appropriate.

16. The system of claim 14, wherein the sensor units are imaging modules.

17. The system of claim 16, wherein the gathered information includes a visual information gathered by the imaging module.

18. The system of claim 14, wherein the object includes one or more of: a second vehicle; a biker; a pedestrian; or a motorcyclist.

19. The system of claim 14, wherein the monitored driver action includes one or more of: an action of a hand of the driver; or a focus direction of eyes of the driver.

* * * * *